United States Patent
Lee et al.

(10) Patent No.: US 10,762,315 B2
(45) Date of Patent: Sep. 1, 2020

(54) LIGHTING CONTROL SYSTEM USING BARCODE INFORMATION

(71) Applicant: Hanam Artec Co., Ltd., Uiwang-si, Gyeonggi-do (KR)

(72) Inventors: Gil Won Lee, Bucheon-si (KR); Ho Lim Song, Seoul (KR); Jung Min Choi, Seoul (KR); Kyung Il Choi, Seoul (KR)

(73) Assignee: Hanam Artec Co., Ltd., Uiwang-si (KR)

( * ) Notice: Subject to any disclaimer, the term of this patent is extended or adjusted under 35 U.S.C. 154(b) by 0 days.

(21) Appl. No.: 16/713,224

(22) Filed: Dec. 13, 2019

(65) Prior Publication Data

US 2020/0117865 A1 Apr. 16, 2020

Related U.S. Application Data

(63) Continuation of application No. 16/502,494, filed on Jul. 3, 2019, now Pat. No. 10,509,930, which is a
(Continued)

(30) Foreign Application Priority Data

Feb. 29, 2016 (KR) .................. 10-2016-0024061
Mar. 11, 2016 (KR) .................. 10-2016-0029824

(51) Int. Cl.
*G06K 7/10* (2006.01)
*H05B 47/19* (2020.01)
(Continued)

(52) U.S. Cl.
CPC ..... *G06K 7/10742* (2013.01); *G06K 7/10881* (2013.01); *G06K 19/06028* (2013.01);
(Continued)

(58) Field of Classification Search
CPC ...... G06K 7/10742; H04W 4/80; H05B 47/19
(Continued)

(56) References Cited

U.S. PATENT DOCUMENTS 3,981,002 A * 9/1976 Gardner ................ G04G 9/107
                                                              345/2.1
4,458,540 A * 7/1984 Little ........................ G01F 1/06
                                                              345/40

(Continued)

FOREIGN PATENT DOCUMENTS

| CN | 103875215 A | 6/2014 |
| GB | 2440784 A | 2/2008 |

(Continued)

OTHER PUBLICATIONS

An Office Action mailed by the Korean Intellectual Property Office dated Aug. 14, 2018, which corresponds to Korean Patent Application No. 10-2018-0013534 and is related to U.S. Appl. No. 15/336,815.

(Continued)

*Primary Examiner* — Michael G Lee
*Assistant Examiner* — David Tardif
(74) *Attorney, Agent, or Firm* — Studebaker & Brackett PC

(57) ABSTRACT

Disclosed is a lighting control system for directing a show. The system includes at least: a master device; and a plurality of slave devices that receive lighting control signals from the master device. The light control signals correspond to seats of a plurality of audiences in an auditorium. The plurality of slave devices receive position information indicating specific positions at which the plurality of slave devices emit a light, light-emitting status information including preset information to classify the plurality of slave devices into a plurality of groups, and group identification number infor-
(Continued)

mation. The plurality of slave devices are grouped in accordance with received information. The master device controls the grouped plurality of slave devices to emit a light per group basis by broadcasting the lighting control signals including group light-emitting pattern information for each of the plurality of groups of the plurality of slave devices.

7 Claims, 18 Drawing Sheets

Related U.S. Application Data continuation of application No. 15/336,815, filed on Oct. 28, 2016, now Pat. No. 10,387,700.

(51) Int. Cl.
    *H05B 47/155*     (2020.01)
    *H04W 4/80*     (2018.01)
    *G06K 19/06*     (2006.01)
    *H04W 84/20*     (2009.01)

(52) U.S. Cl.
    CPC ............ *H04W 4/80* (2018.02); *H05B 47/155* (2020.01); *H05B 47/19* (2020.01); *H04W 84/20* (2013.01)

(58) Field of Classification Search
    USPC .................................................. 235/462.06
    See application file for complete search history.

(56) References Cited

U.S. PATENT DOCUMENTS

| | | | |
|---|---|---|---|
| 2006/0097660 | A1 | 5/2006 | Scott et al. |
| 2009/0230894 | A1* | 9/2009 | De Goederen ........ H05B 47/19 315/314 |
| 2012/0299509 | A1 | 11/2012 | Lee et al. |
| 2014/0300276 | A1 | 10/2014 | Wang |
| 2015/0179029 | A1 | 6/2015 | Bailey et al. |
| 2017/0299698 | A1* | 10/2017 | Yagi ........................ G01S 17/36 |

FOREIGN PATENT DOCUMENTS

| | | |
|---|---|---|
| JP | S56-124995 U | 9/1981 |
| JP | 2003-036981 A | 2/2003 |
| JP | 2003-229284 A | 8/2003 |
| JP | 2005-71853 A | 3/2005 |
| JP | 2007-5094 A | 1/2007 |
| JP | 2009-70832 A | 4/2009 |
| JP | 2014-130681 A | 7/2014 |
| JP | 2014-212021 A | 11/2014 |
| JP | 2014-529844 A | 11/2014 |
| JP | 2015-002958 A | 1/2015 |
| JP | 2015-11981 A | 1/2015 |
| JP | 2015-115317 A | 6/2015 |
| KR | 20-1994-0005504 Y1 | 8/1994 |
| KR | 10-2007-0053468 A | 5/2007 |
| KR | 10-0920023 B1 | 10/2009 |
| KR | 10-2014-0000765 A | 1/2014 |
| KR | 10-2014-0081282 A | 7/2014 |
| KR | 10-2015-0009405 A | 1/2015 |
| KR | 10-2015-0055938 A | 5/2015 |

OTHER PUBLICATIONS

An Office Action mailed by the Japanese Patent Office dated Aug. 15, 2017, which corresponds to Japanese Patent Application No. 2016-218180 and is related to U.S. Appl. No. 15/336,815.
An Office Action mailed by the State Intellectual Property Office of the People's Republic of China dated May 2, 2018, which corresponds to Chinese Patent Application No. 201610950634.2 and is related to U.S. Appl. No. 15/336,815.
The extended European search report issued by the European Patent Office dated Apr. 21, 2017, which corresponds to European Patent Application No. 16196890.4 and is related to U.S. Appl. No. 15/336,815.
The extended European search report issued by the European Patent Office dated Jul. 18, 2018, which corresponds to European Patent Application No. 18159136.3 and is related to U.S. Appl. No. 15/336,815.
An Office Action mailed by the Korean Intellectual Property Office dated Feb. 15, 2019, which corresponds to Korean Patent Application No. 10-2019-0015085 and is related to U.S. Appl. No. 15/336,815.
Korean Office Action for corresponding Korean Patent Application No. 10-2016-0024061 dated Sep. 9, 2016, citing the above references(s).
Korean Office Action for corresponding Korean Patent Application No. 10-2016-0029824 dated Sep. 6, 2016, citing the above references(s).

\* cited by examiner

LIGHTING CONTROL SYSTEM USING BARCODE INFORMATION

CROSS-REFERENCE TO RELATED APPLICATIONS

The present application is a continuation of U.S. patent application Ser. No. 16/502,494, filed on Jul. 3, 2019, which is a continuation of U.S. patent application Ser. No. 15/336,815, filed on Oct. 28, 2016, which is based upon and claims the benefit of priority to Korean Patent Application No. 10-2016-0024061 filed Feb. 29, 2016 and Korean Patent Application No. 10-2016-0029824 filed Mar. 11, 2016, in the Korean Intellectual Property Office. The disclosures of the above-listed applications are hereby incorporated by reference herein in their entirety.

BACKGROUND

Embodiments of the inventive concept described herein relate to a lighting control system, and more particularly, relate to a lighting control system capable of effectively controlling a lighting pattern of a plurality of lighting devices by adjusting electrical code information or an intensity of a radio wave.

In general, a lighting device means a light emitting device that is used for illumination by reflecting, refracting, or transmitting a light provided from a light source. The lighting device is classified into an indirect lighting device, a semi-indirect lighting device, a general diffuse lighting device, a semi-direct lighting device, and a direct lighting device depending on the distribution of the light.

With the development of the technology, the lighting device has been used for a variety of purposes. As an example, the lighting device is used to create media facades. The media facades are layers of controllable lights attached to the exterior surface of a building to function as media screens.

As another example, the lighting device is used as a cheering tool in a sport event or a concert being held below a predetermined luminance level. However, since a plurality of lighting devices is individually controlled in such an environment, it is difficult to form systematic lighting patterns or shapes. In addition, it is not easy to achieve a cheering effect as expected by only using the light source of the lighting device.

Accordingly, a method of uniformly controlling a plurality of lighting devices is required to solve the difficulties described above.

Also, various forms of stage effects are displayed using a plurality of light emitting devices (e.g. lighting devices) for the light emitting type cheering tool used in concerts or sport events or for a structure of outer walls in a building. A director or a producer controls the light emitting devices, which are used for various purposes, individually or as a group through a central processing unit such as a master device to create various light emitting patterns. Meanwhile, in the method of controlling the light emitting devices, a light emitting control signal is transmitted from the master device to a plurality of slave devices (e.g., light emitting devices) through a wireless communication such that the various light emitting patterns are produced.

Conventionally, a position of a lighting device is calculated by using an RSSI signal for controlling a light lighting of the lighting device. However, it is difficult to accurately calculate the position of the lighting device due to various factors with the conventional calculating method.

In addition, it is required to transmit data, such as pixel value, to all the plurality of lighting devices in order to display contents, e.g., animation, using the plurality of lighting devices. However, it is difficult to transmit the data to the plurality of lighting devices through wireless signal.

In a conventional method of displaying light emitting patterns, one control device (e.g., the master device) controls the operation of a plurality of light emitting devices (e.g., the slave device), and thus it is difficult to group the plurality of light emitting devices and display the light emitting patterns in real time or periodically.

Also, when using a portable light emitting device that is able to be hand carried by a person (e.g., a light emitting type cheering tool), predetermined light emitting patterns may be in disorder due to a movement of the person carrying the portable light emitting device. In this case, it is difficult to check every movement of the person and control the light emitting device carried by the person.

SUMMARY

Embodiments of the inventive concept provide a lighting control system for controlling a lighting of a lighting device using electrical code information previously set to predict a position of the lighting device.

Embodiments of the inventive concept provide a method of controlling a lighting pattern of slave devices arranged in the vicinity of sub-master devices by controlling a radio wave intensity of at least one sub-master device in a master device.

According to an aspect of an embodiment, a master device controlling one or more slave devices includes a communication unit, an electrical code identification unit identifying electrical code information previously output, an information check unit checking light-emitting position information previously set in accordance with the identified electrical code information and indicating specific positions at which the slave devices emit a light, an information providing unit providing the checked light-emitting position information to a first slave device corresponding to one of the slave devices, and a lighting control unit broadcasting the lighting control signal corresponding to the light-emitting position information through the communication unit.

The information check unit further checks directing information to allow the first slave device to emit the light in a pattern previously set in accordance with the light-emitting position information, and the information providing unit further provides the directing information to the first slave device.

The directing information is information, which is activated when the lighting control signal is received, to control the first slave device such that a lighting unit of the first slave device emits the light distinguished by one or more predetermined periods.

The lighting control unit transmits a lock signal to the slave devices to drive the first slave device in a lock mode during the predetermined period.

When a previously-set condition is satisfied, the information providing unit transmits the light-emitting position information of the first slave device, the directing information of the first slave device, and a control signal to the first slave device, and the control signal allows the light-emitting position information and the directing information of the first slave device to be transmitted to a second slave device disposed adjacent to the first slave device.

According to another aspect of an embodiment, a slave device controlled by a master device includes a communication unit, a lighting unit including at least one light source device, an information receiving unit receiving light-emitting position information corresponding to electrical code information previously set from the master device, and a lighting control unit selectively receiving a lighting control signal corresponding to the light-emitting position information at a position corresponding to the light-emitting position information among lighting control signals broadcasted by the master device and controlling the lighting unit on the basis of the received lighting control signal.

The information receiving unit further receives directing information to allow the slave device to emit a light in a pattern previously set in accordance with the light-emitting position information, and the lighting control unit controls the lighting unit such that the lighting unit emits the light distinguished by one or more predetermined periods when receiving the lighting control signal.

The lighting control unit operates the slave device in a lock mode during the predetermined period when the lighting control unit receives a lock signal from the master device.

When a previously-set condition is satisfied, the lighting control unit controls the communication unit to transmit the light-emitting position information to another slave device disposed adjacent to the slave device.

The lighting control unit allows the lighting unit to emit the light having a predetermined color when the light-emitting position information is completely received.

The slave device outputs a lighting pattern in conjunction with a user terminal of a user by transmitting the received lighting control signal to the user terminal or emits the light in response to a control signal input thereto through the user terminal.

According to another aspect of an embodiment, a master device controlling one or more slave devices through at least one sub-master device includes a communication unit, an electrical code identification unit identifying electrical code information previously output, an information check unit checking light-emitting position information previously set in accordance with the identified electrical code information and indicating a specific light-emitting position at which a specific slave device among the slave devices emit a light, an information providing unit inserting the checked light-emitting position information to the specific slave device, and a lighting control unit providing a lighting control signal to a first sub-master device through the communication unit to selectively control the lighting of the specific slave device by controlling a radio wave intensity of the first sub-master device located at a position spaced apart from the specific light-emitting position of the specific slave device.

The lighting control signal includes a radio wave intensity value of the first sub-mater device and a first lighting pattern value set to allow the first sub-master device to control a lighting pattern of the specific slave device when the specific slave device is located in a first control radius set in accordance with the radio wave intensity value of the first sub-mater device.

The lighting control signal includes a radio wave intensity value of a second sub-mater device spaced apart from the first sub-master device by a predetermined distance and a second lighting pattern value set to allow the second sub-master device to control the lighting pattern of the specific slave device when the specific slave device is located in a second control radius set in accordance with the radio wave intensity value of the second sub-mater device, and when the specific slave device moves to the second control radius from the first control radius, the specific slave device emitting the light in accordance with the first lighting pattern value emits the light in accordance with the second lighting pattern value.

When the specific slave device is disposed in both of the first control radius and the second control radius, the specific slave device emits the light having an average value of the first lighting pattern value and the second lighting pattern value.

The first lighting pattern value and the second lighting pattern value include at least one of a lighting timing value, a lighting color value, and a lighting duration time value of the specific slave device.

The communication unit connects the master device and the first sub-mater device in a wired communication network.

According to another aspect of an embodiment, a lighting control method with a control of a radio wave intensity, in which one or more slave devices are controlled by a master device through at least one sub-master device, includes identifying electrical code information previously output, checking light-emitting position information previously set in accordance with the identified electrical code information and indicating a specific light-emitting position at which a specific slave device among the slave devices emit a light, inserting the checked light-emitting position information to the specific slave device, and providing a lighting control signal to a first sub-master device through the communication unit to selectively control the lighting of the specific slave device by controlling a radio wave intensity of the first sub-master device located at a position spaced apart from the specific light-emitting position of the specific slave device.

According to the above, the light-emitting position information previously set in accordance with the electrical code information of tickets are inserted into each slave device (e.g., a lighting device or a lighting device), and thus various types of the lighting patterns may be controlled.

In addition, the slave devices may be controlled in real time or by groups after being grouped on the basis of the light-emitting position information, and scene having high quality may be directed by previously storing the directing information corresponding to the light-emitting position information to the slave device. Accordingly, various lighting patterns may be generated in concerts or sport events, and cheering effects caused by the various lighting patterns may be improved.

Further, since the slave device is driven in the lock mode during the predetermined period, defects may be prevented from occurring on the direction using the lighting.

When the light-emitting position information is not inserted into the slave device, the light-emitting position information is transmitted to the slave device not having the light-emitting position information through the slave device arranged adjacent to the slave device not having the light-emitting position information, and thus a user convenience and an efficiency of a directing operation may be improved.

In addition, according to the master device according to various embodiments of the inventive concept, the slave devices may be effectively grouped and controlled by appropriately adjusting the radio wave intensity of the sub-master devices.

Each sub-master device according to various embodiments of the inventive concept has the control radius with various forms in accordance with the control of the radio wave intensity, so that the slave devices coupled to and moving with the sub-master devices may be effectively controlled.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

The inventive concept and methods of accomplishing the same may be understood more readily by reference to the following detailed description of embodiments and the accompanying drawings. However, the inventive concept may be embodied in many different forms, and should not be construed as being limited to the embodiments set forth herein. Rather, these embodiments are provided so that this disclosure will be thorough and complete and will fully convey the concept of the invention to those skilled in the art, and the inventive concept will only be defined by the appended claims. Like numbers refer to like elements throughout.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following descriptions, the term "lighting control signal" used herein may include at least one of a "first lighting control signal" and a "second lighting signal". The first lighting control signal may be a signal required to control a sub-master device 200 by a master device 100, and the second lighting control signal may be a signal required to control a slave device 300 by the master device 100. Unless otherwise defined, the lighting control signal may mean one of the first lighting control signal and the second lighting control and may be defined by a specific operation of the master device 100.

Hereinafter, a lighting control system using machine-readable code containing data (hereinafter, referred to as "electrical code information") will be described in detail with reference to accompanying drawings.

Figure 1:
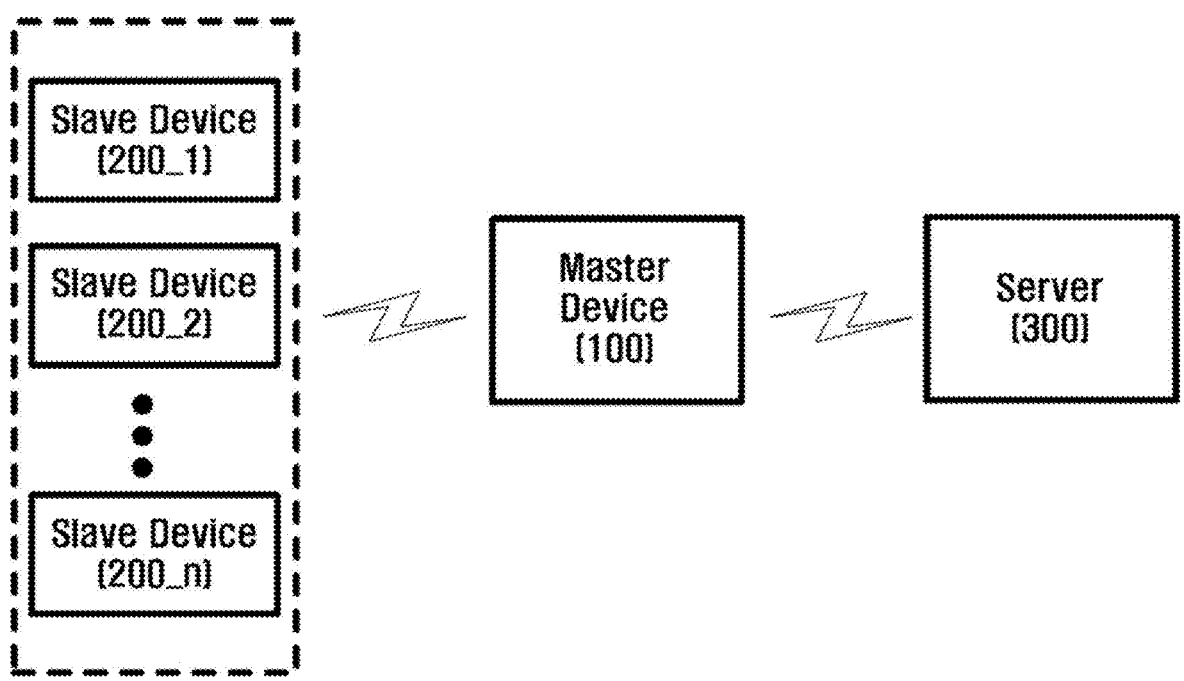
FIG. 1 is a block diagram showing a lighting control system according to various exemplary embodiments of the inventive concept.

FIG. 1 is a block diagram showing a lighting control system 10 according to various exemplary embodiments of the inventive concept.

The lighting control system 10 includes a master device 100, a slave device 200, and a server 300. The lighting control system 10 controls a lighting of the slave device 200, e.g., a lighting device, a lighting device, to direct various lighting patterns for cheering in a concert hall.

The master device 100 may independently perform a function of controlling the lighting of at least one slave device 200 or communicate with the server 300 to perform the controlling function of the lighting of the slave device 200. For instance, the master device 100 may be configured to have a kiosk form, may include a portion of components of a smart phone, a tablet, a desktop personal computer, a laptop personal computer, or a netbook computer, may be one of the smart phone, the tablet, the desktop personal computer, the laptop personal computer, and the netbook computer, or may be one of various electronic devices operated in conjunction with those devices.

The slave device 200 may perform a function of directing various types of lighting patterns in real time or by a predetermined interval under the control of the master device 100. The slave device 200 may be a small cheering tool in which at least a portion thereof emits a light in various shapes in sport events, concerts, etc.

The server 300 may communicate with the master device 100 and perform a function of applying various types of information, which will be provided to the slave device 200, to the master device 100. For instance, the server 300 receives electrical code information from the master device 100 and provides at least one of light-emitting position information and directing information corresponding to the electrical code information to the master device 100.

The master device 100, the slave device 200, and the server 300 may mutually communicate with each other in various ways. For instance, the master device 100 and the slave device 200 may be connected to each other through a wireless communication, such as a RF communication, an electric tag, etc., and the master device 100 and the server 300 may be connected to each other through a telecommunication network, but they should not be limited thereto or thereby.

Figure 2:
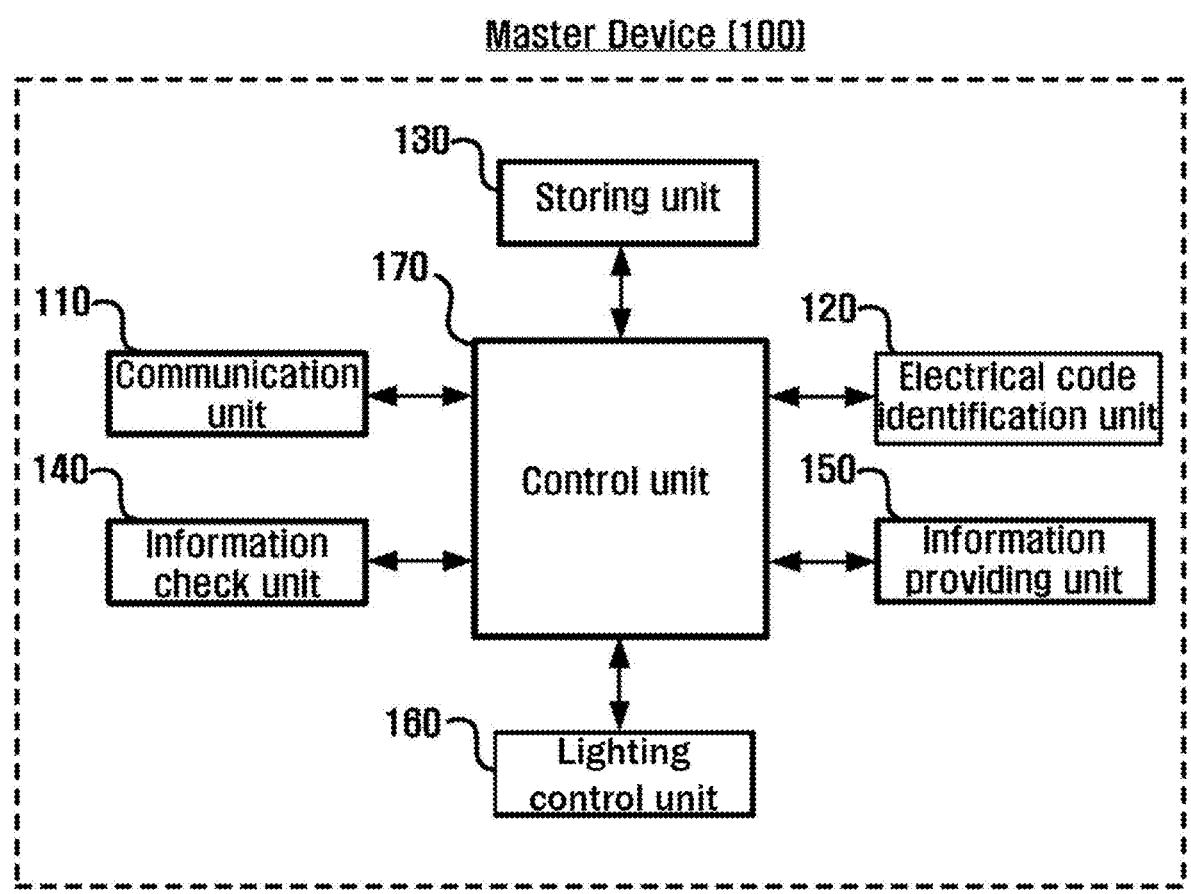
FIG. 2 is a block diagram showing a master device according to various exemplary embodiments of the inventive concept.

FIG. 2 is a block diagram showing the master device 100 according to various exemplary embodiments of the inventive concept.

The master device 100 includes a communication unit 110, an electrical code identification unit 120, a storing unit 130, an information check unit 140, an information providing unit 150, a lighting control unit 160, and a control unit 170. According to various embodiments, the master device 100 may further include additional units, e.g., an input module, a display module, a power module, an audio module, etc., or some units of the master device 100 shown in FIG. 2 may be omitted.

The communication unit 110 may provide a communication between the master device 100 and the slave device 200 or between the master device 100 and the server 300. The communication unit 110 may include, for example, at least one of a wired communication module (e.g., a connector, a connector module, etc.) and a wireless communication module (e.g., an RF transceiver, a Zigbee module, a Bluetooth, a WIFI module, etc.).

The electrical code identification unit 120 may perform a function of receiving an electrical code printed on a show ticket or a concert ticket. As an example, the electrical code may be a code, such as a bar code or a QR code, in which information printed on a ticket are identified by various electronic devices, but it should not be limited thereto or thereby. The electrical code identification unit 120 may be an optical scanner or a QR code identifier that scans the electrical code to collect the electrical code information, but it should not be limited thereto or thereby. In FIG. 2, the electrical code identification unit 120 is implemented in the master device 100, but the electrical code identification unit 120 may be implemented separated from the mater device 100 according to various embodiments. In this case, the master device 100 may receive the electrical code information from the electrical code identification unit 120 through a wired or wireless network.

The storing unit 130 may store data provided from or generated by other components of the control unit 170, the master device 100, or the lighting control system 10. The storing unit 130 may include, for example, a memory, a cash, a buffer, etc.

According to various embodiments, the storing unit 130 may store the electrical code information provided from the ticket, the light-emitting position information that are previously set depending on the electrical code information, and the directing information corresponding to the light-emitting position. The electrical code information, the light-emitting position information, and the directing information may be implemented in a mapping table to be mutually compatible, but they should not be limited thereto or thereby.

According to some embodiments, the electrical code, which allows a position of a seat of a person who purchased the ticket in the concert hall to be checked through the master device 100 or the server 300, may be printed on the ticket. In addition, seat information, such as Korean, English, Arabic numerals, etc., may be further printed on the ticket such that the person who purchases the ticket checks the position of the seat.

According to some embodiments, the light-emitting position information may be information that are previously set to identify or group a plurality of slave devices 200 for the directing of the show in the master device 100 or the server 300. The light-emitting position information may be substantially the same as the seat information that are recognized by the person or may be set by adding additional identification information to the seat information, and the light-emitting position information may be set previously or in real time by an administrator of the lighting control system 10 or a show policy.

According to some embodiments, in a case that a relatively high quality lighting pattern (e.g., a screen represented by images) is directed through the slave devices 200, the directing information may be previously stored (e.g., insertion) in the slave device 200 from the master device 100. In general, since data simultaneously transmitted through the wireless communication are restricted, the directing information, such as pixel information, are required to be previously provided to the slave devices 200 when the high quality lighting pattern is directed. Accordingly, the master device 100 may previously provide the directing information corresponding to the light-emitting position information to the slave device 200.

The information check unit 140 may receive the collected electrical code information from the electrical code identification unit 120 and check the light-emitting position information corresponding to the electrical code information in the storing unit 130 or the server 300. The information check unit 140 may transmit the collected electrical code information to the server 300 from the electrical code identification unit 120 through the communication unit 110 and check the light-emitting position information corresponding to the electrical code information in the server 300. In addition, the information check unit 140 may transmit the checked light-emitting position information to the information providing unit 150.

The information providing unit 150 may provide (e.g., insertion) at least one of the light-emitting position information checked by the information check unit 140 and the directing information to the slave device 200. The information providing unit 150 may transmit the light-emitting position information or the directing information to the slave device 200 through the communication unit 110, such as an RF module.

The lighting control unit 160 may broadcast a lighting control signal corresponding to the light-emitting position information through a wireless network. For instance, the lighting control unit 160 may broadcast the lighting control signal to the slave devices 200, and each slave device 200 may selectively receive the lighting control signal corresponding to the light-emitting position information thereof among the broadcasted lighting control signals.

The control unit 170 may perform a data processing function to control an overall operation, e.g., a control of power supply, of the master device 100 and a signal flow between components in the master device 100. The control unit 170 may include at least one processor.

The information check unit 140, the information providing unit 150, and the lighting control unit 160 may be functional components separately provided to distinguish at least some functions of the control unit 170 from common functions of the control unit 170. In FIG. 2, the information check unit 140, the information providing unit 150, and the lighting control unit 160 are shown as separate components from the control unit 170, but the information check unit 140, the information providing unit 150, and the lighting control unit 160 may be configured with the control unit 170 as a single module.

Figure 3:
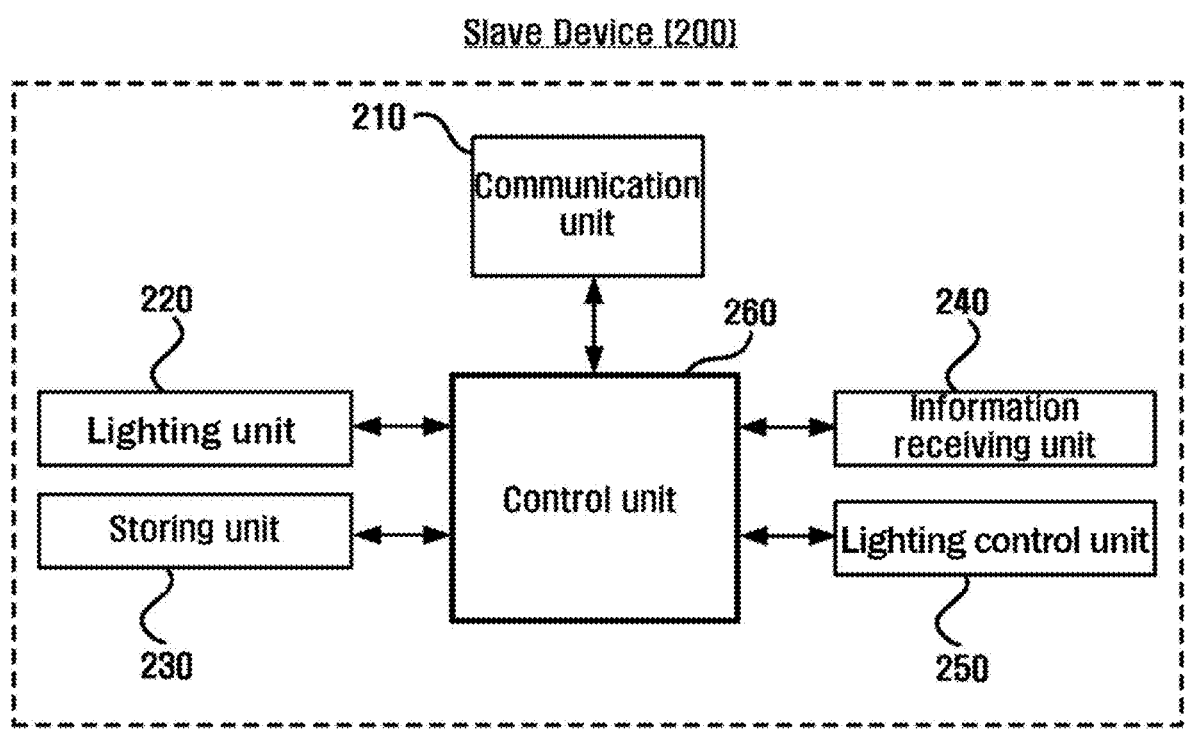
FIG. 3 is a block diagram showing a slave device according to various exemplary embodiments of the inventive concept.

FIG. 3 is a block diagram showing the slave device 200 according to various exemplary embodiments of the inventive concept.

The slave device 200 may include a communication unit 210, a lighting unit 220, a storing unit 230, an information receiving unit 240, a lighting control unit 250, and a control unit 260. According to various embodiments, the slave device 200 may further include additional units, e.g., an input module, a display module, a power module, an audio module, etc., or some units of the slave device 200 shown in FIG. 3 may be omitted.

The communication unit 210 may provide a communication between the master device 100 and the slave device 200. The communication unit 210 may include, for example, at least one of a wired communication module (e.g., a connector, a connector module, etc.) and a wireless communication module (e.g., an RF transceiver, a Zigbee module, a Bluetooth, a WIFI module, etc.).

According to various embodiments, the communication unit 210 of the slave device 200 may receive the light-emitting position information and the directing information corresponding to the light-emitting position from the master device 100 (e.g., a smart phone) using the Zigbee module or the Bluetooth module.

The lighting module 220 may include one or more light source devices, e.g., a light emitting diode (LED). In addition, the lighting module 220 may include LEDs having different colors from each other. For instance, the lighting module 220 may include at least one of a red LED, a green LED, a blue LED, and a white LED.

When lights respectively emitted from the LEDs are mixed with each other, a color with a wide range may be obtained, and the mixed color is determined depending on a ratio of intensity of the lights emitted from the LEDs. The intensity of the lights emitted from the LEDs may be proportional to a driving current of each of the LEDs.

That is, the color of the light emitted from the lighting unit 220 may be controlled by controlling the driving current of each LED. The LEDs may be arranged in a dot shape, and a specific sentence (text) or an image may be displayed by selectively turning on the LEDs.

In the present exemplary embodiment, the LED has been described as the light source of the lighting unit 220, but the light source should not be limited to the LED. According to another embodiment, an organic light emitting diode (OLED) may be employed as the light source of the lighting unit 220.

The storing unit 230 may store data provided from or generated by other components of the control unit 260, the slave device 200, or the lighting control system 10. The storing unit 230 may include, for example, a memory, a cash, a buffer, etc.

According to various embodiments, the storing unit 230 may store the light-emitting position information, which are previously set depending on the electrical code information, and the directing information corresponding to the light-emitting position. In addition, the storing unit 230 may provide the stored light-emitting position information or the directing information to the lighting control unit 250 or the control unit 260 in response to a requirement from the lighting control unit 250 or the control unit 260.

The information receiving unit 240 may receive the light-emitting position information or the directing information from the master device 100 through the communication unit 210. For instance, the information receiving unit 240 may receive at least one of the light-emitting position information and the directing information from the master device 100 through an RF communication.

The lighting control unit 250 may selectively receive the lighting control signal corresponding to the light-emitting position information of the storing unit 230 among the lighting control signals broadcasted by the master device 100 and control the lighting unit 220 on the basis of the received lighting control signal. According to various embodiments, the lighting control unit 250 may receive the directing information from the master device 100 through the Zigbee module.

The control unit 260 may perform a data processing function to control an overall operation, e.g., a control of power supply, of the slave device 200 and a signal flow between components in the slave device 200. The control unit 260 may include at least one processor.

The information receiving unit 240 and the lighting control unit 250 may be functional components separately provided to distinguish at least some functions of the control unit 260 from common functions of the control unit 260. In FIG. 3, the information receiving unit 240 and the lighting control unit 250 are shown as separate components from the control unit 260, but the information receiving unit 240 and the lighting control unit 250 may be configured with the control unit 260 as a single module.

Although not shown in figures, the slave device 200 may communicate with a user terminal (e.g., a smart phone) of a user to transmit lighting-related information to the user terminal. The lighting-related information may include, for example, at least one of the lighting pattern, the directing information, and the lighting control signal. The user terminal may emit the light in conjunction with the cheering tool (e.g., the slave device 200) on the basis of the received lighting-related information. To this end, the user terminal may output the same lighting pattern as the lighting pattern of the slave device 200, the similar lighting pattern as the lighting pattern of the slave device 200, or another lighting pattern previously stored corresponding to the lighting pattern of the slave device 200 through a display device, e.g., a touch screen, etc., and an application may be installed in the user terminal for the above-mentioned function. According to various embodiments, the slave device 200 may communicate with the user terminal through a Bluetooth mode, and the user may directly control the lighting pattern of the slave device 200 by using the user terminal.

Figure 4:
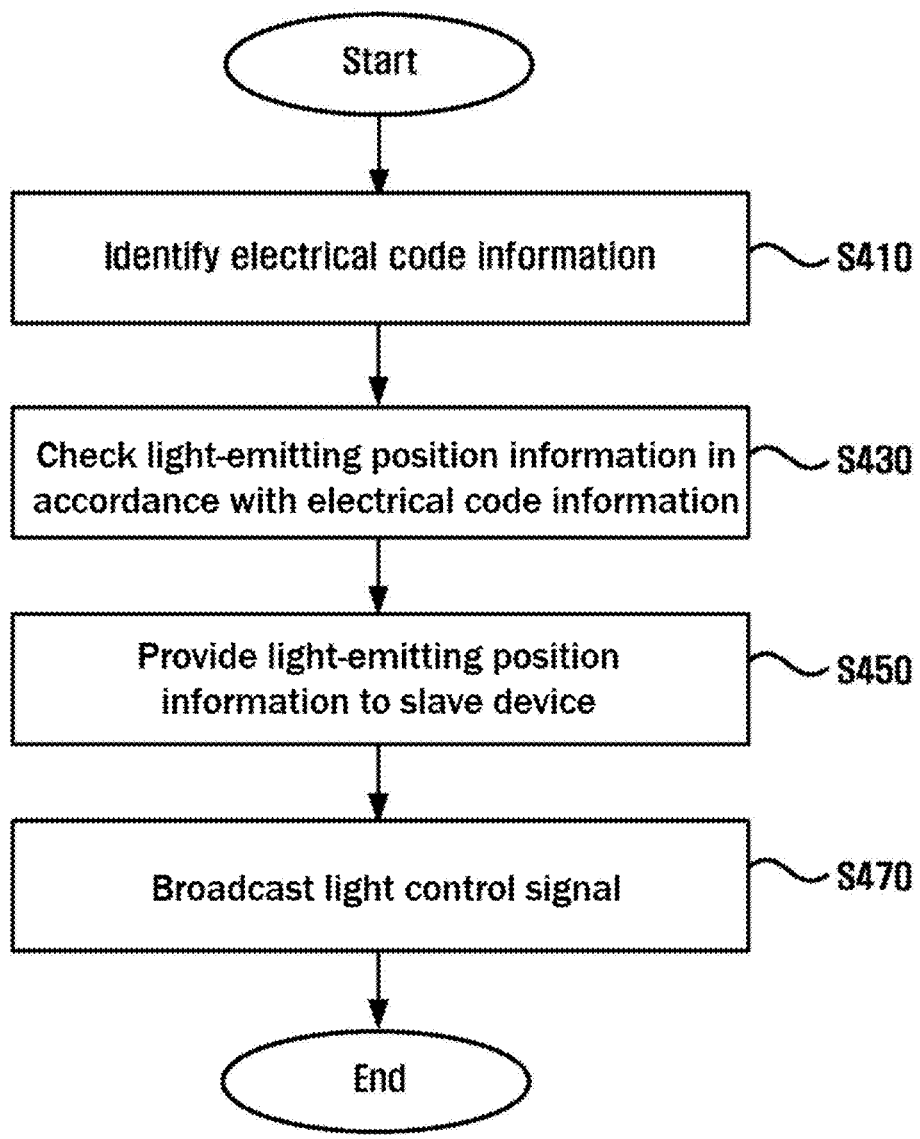
FIG. 4 is a flowchart showing an operation of controlling a lighting of a slave device by a master device according to various exemplary embodiments of the inventive concept.

FIG. 4 is a flowchart showing an operation of controlling a lighting of the slave device 200 by the master device 100 according to various exemplary embodiments of the inventive concept.

In operation S410, the master device 100 scans the electrical code printed on the ticket of audiences to identify the electrical code information. For instance, the user (e.g., administrator) of the master device 100 may scan the electrical code information printed on the ticket using the electrical code identification unit 120, e.g., optical scanner, and extract the electrical code information.

Then, in operation S430, the master device 100 may check the light-emitting position information in accordance with the electrical code information. For instance, the master device 100 may check the light-emitting position information mapped in the electrical code information on the storing unit 130 or the server.

In operation S450, the master device 100 may provide (e.g., insertion) the checked light-emitting position information to the slave device 200. For instance, after the checking of the electrical code information and the providing of the light-emitting position information, the administrator of the master device 100 may provide the slave device 200, into which the light-emitting position information is inserted, to the audiences who brought the ticket. The audiences may confirm an assigned seat in the concert hall on the basis of the seat information and may sit in the corresponding seat.

In operation S470, the master device 100 may broadcast the lighting control signal. For instance, the master device 100 may transmit the lighting control signal to the slave devices 200 in accordance with a certain scenario of the show or the real time control. In this case, the master device 100 may continuously or periodically broadcast or transmit the same lighting control signal to the slave devices 200 that are unspecified.

Figure 5:
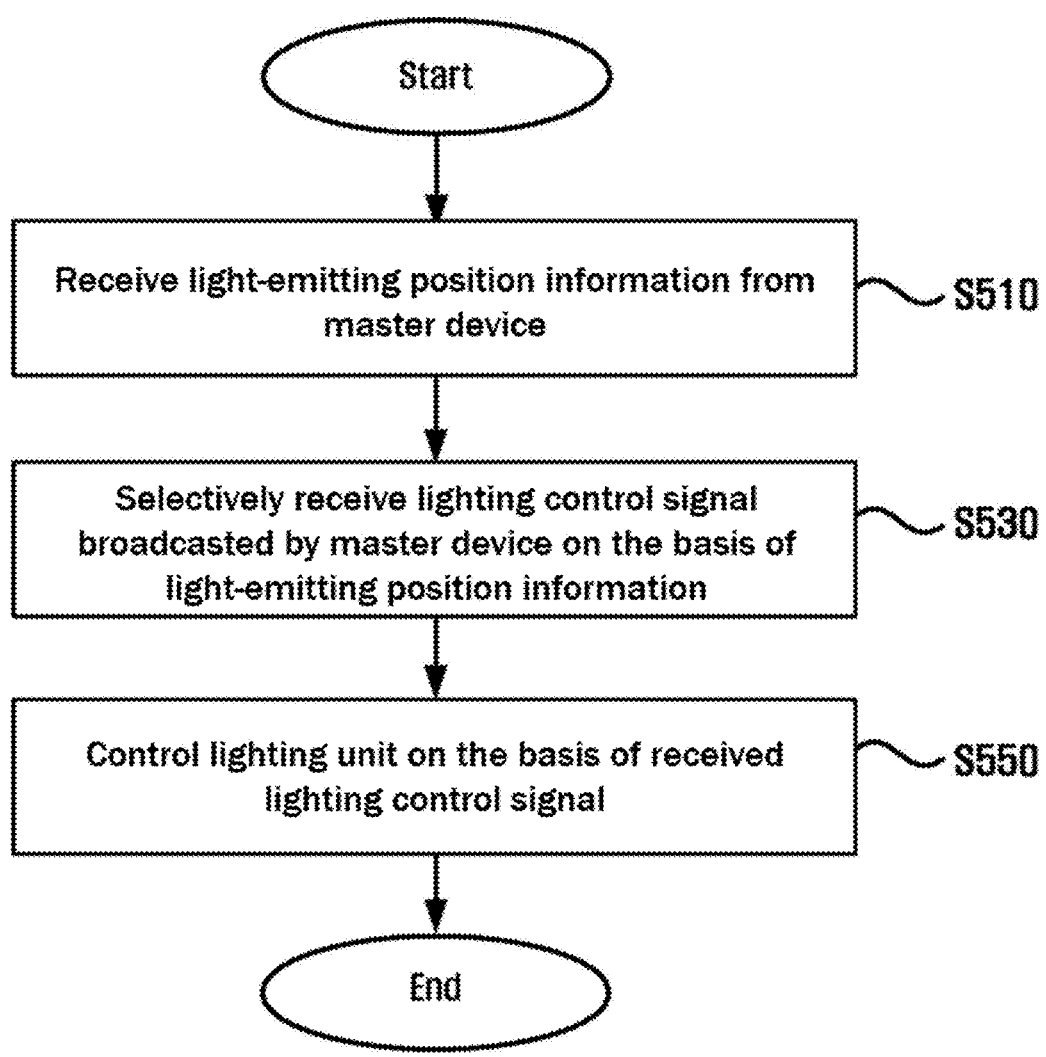
FIG. 5 is a flowchart showing an operation of a lighting unit in a slave device under a control of a master device according to various exemplary embodiments of the inventive concept.

FIG. 5 is a flowchart showing an operation of the lighting unit 220 in the slave device 200 under the control of the master device 100 according to various exemplary embodiments of the inventive concept.

In operation S510, the slave device 200 may receive the light-emitting position information from the master device 100 and store the received light-emitting position information in the storing unit 230.

In operation S530, the slave device 200 may selectively receive the lighting control signal corresponding to the light-emitting position information stored in the storing unit 230 among the lighting control signals broadcasted by the master device 100. In addition, the slave device 200 may control the lighting unit 220 on the basis of the received lighting control signal to output the various lighting patterns in operation S550.

Figure 6:
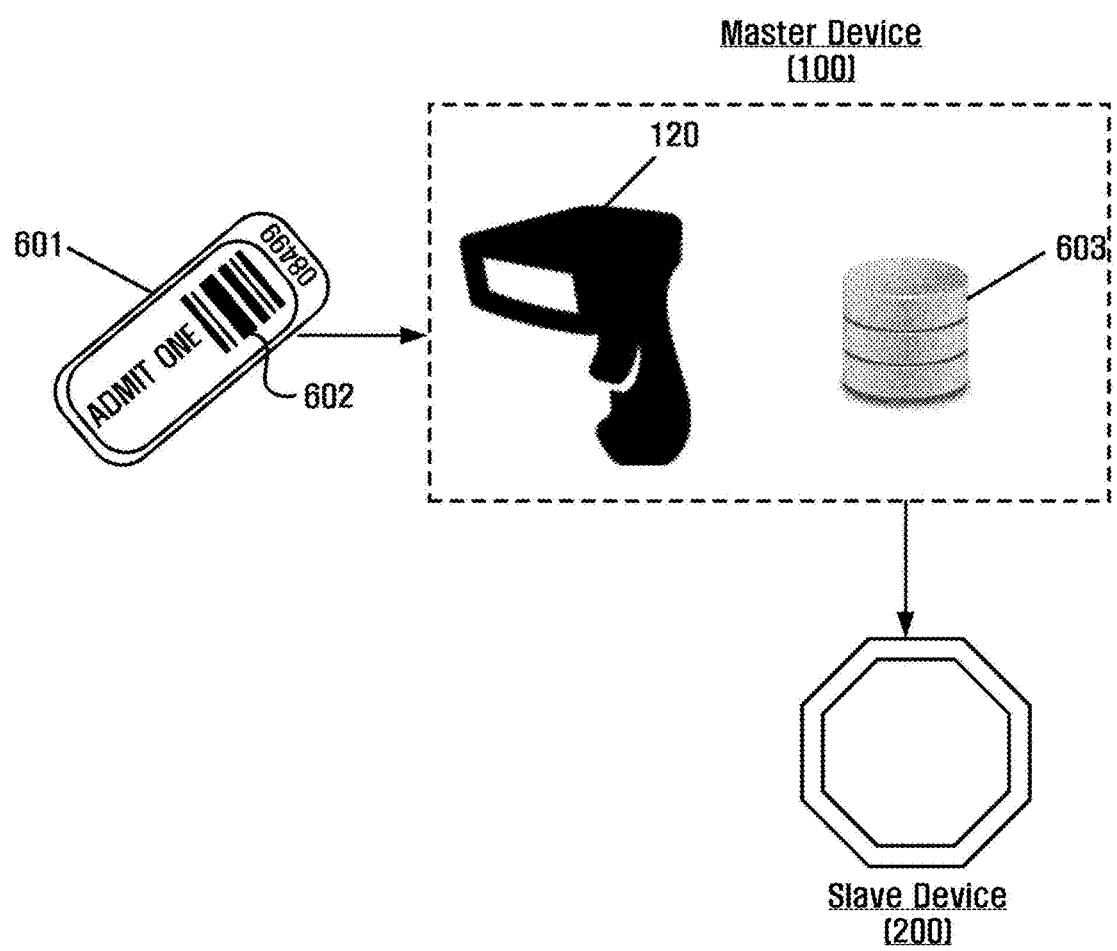
FIG. 6 is a view showing an operation of scanning electrical code information of a ticket in a master device and providing light-emitting position information corresponding to the electrical code information to a slave device according to various exemplary embodiments of the inventive concept.

FIG. 6 is a view showing an operation of scanning electrical code information of the ticket in the master device 100 and providing the light-emitting position information corresponding to the electrical code information to the slave device 100 according to various exemplary embodiments of the inventive concept.

As shown in FIG. 6, the master device 100 may scan the electric code 602 of the ticket 601 held in the audiences using the electrical code identification unit 120 to collect the electrical code information. In addition, in the case that the master device 100 is provided separately from the electrical code identification unit 120, the master device 100 may receive the electrical code information collected by the electrical code identification unit 120 through an intermediate medium, such as kiosk, a physical medium, such as an USB, or a network.

The master device 100 may check the light-emitting position information corresponding to the collected electrical code information in the storing unit 130 or in a database (DB) 103 of the server 300 and may provide the checked light-emitting position information to the slave device 200. In this case, the master device 100 may tag the slave device 200 through the information providing unit 150, such as an RF tag device, and thus the master device 100 may insert the light-emitting position information into the slave device 200.

According to embodiments, the slave device 200 may allow the lighting unit 220 to emit the light with the predetermined color when the slave device 200 receives the light-emitting position information. Accordingly, it may be checked whether the information is successfully inserted into the slave device 200 by the lighting control system 10 or the administrator of the master device 100.

Figure 7:
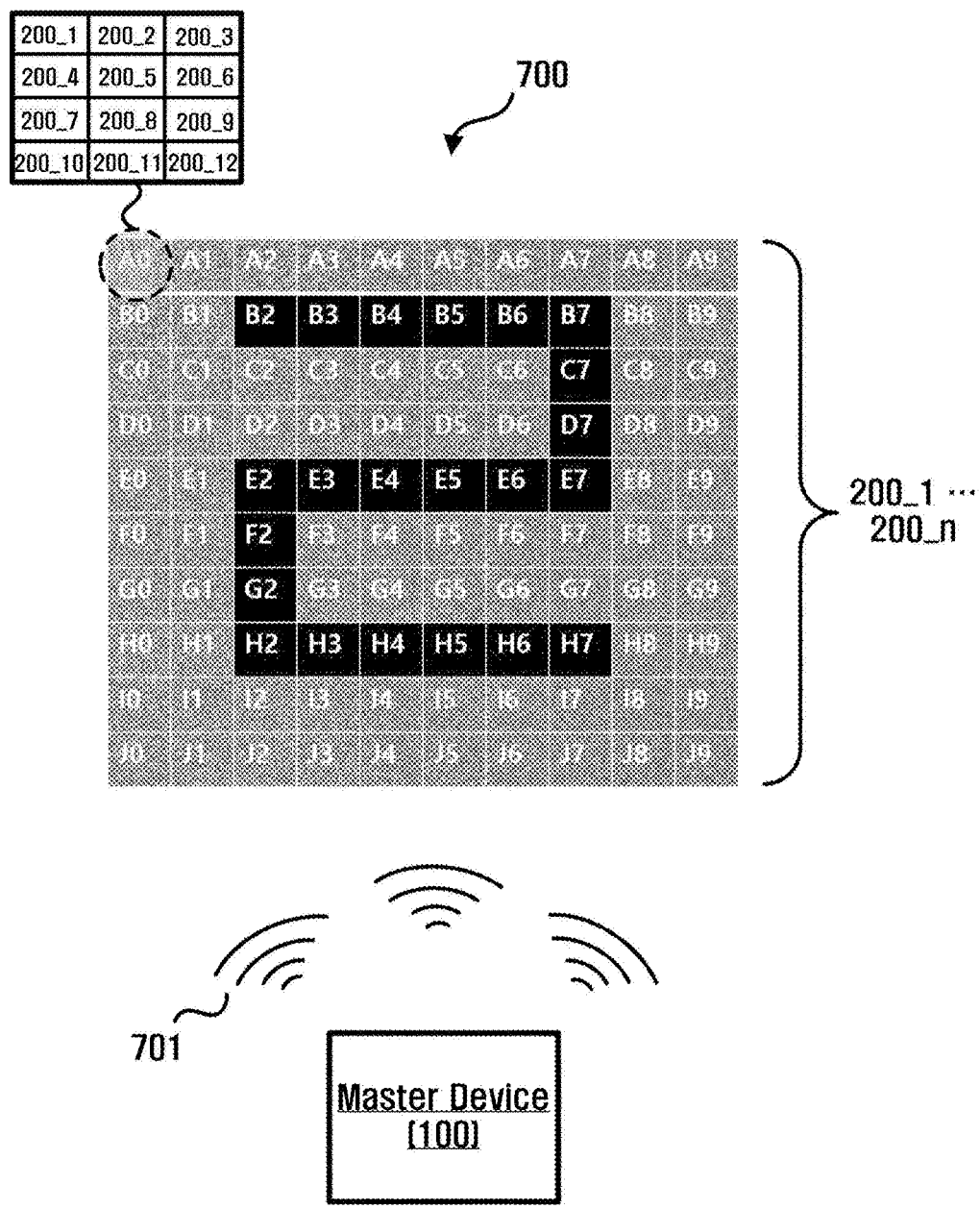
FIG. 7 is a view showing an operation of controlling a lighting of slave devices in real time in a master device according to various exemplary embodiments of the inventive concept.

FIG. 7 is a view showing an operation of controlling the lighting of slave devices 200 in real time by the master device 100 according to various exemplary embodiments of the inventive concept. FIG. 7 shows the slave device 200 into which the light-emitting position information is inserted and the master device 100 controlling the slave device 200 in real time.

Referring to FIG. 7, an auditorium 700 in which a plurality of slave devices 200_1 to 200_n is disposed and the master device 100 are shown. The auditorium 700 includes groups of A0 to J9, and one group (e.g., A0) may include the slave devices 200_1 to 200-12 of the audiences sitting in seats. For instance, the A0 group may include twelve seats, and the light-emitting position information of a first slave device 200_1 located at a first seat of the A0 group may be previously set as "A001". Similarly, the light-emitting position information of a second slave device 200_2 located at a second seat of the A0 group may be previously set as "A002". However, the group classification method or the number of the slave devices 200 in each group should not be limited thereto or thereby.

The master device 100 may broadcast the lighting control signal 701 to the slave devices 200_1 to 200_n after the show begins or during the show. The lighting control signal 701 may be a signal directing the slave devices to output the number "2" when viewed as a whole as shown in FIG. 7. In detail, the slave devices 200_1 to 200_12 of the A0 group may receive the information (e.g., a blue LED lighting signal) corresponding to the light-emitting position information of the A0 group among the broadcasted lighting control signals 701, and thus the slave device 200_1 to 200_12 of the A0 group may output the blue light. The slave devices of the B2 group may receive the information (e.g., a red LED lighting signal) corresponding to the light-emitting position information of the B2 group among the broadcasted lighting control signals 701, and thus the slave device of the B2 group may output the red light.

Although not shown in FIG. 7, the lighting shape or the lighting pattern directed by the real time control may be controlled in a color book method in addition to the dot method. For instance, in the case that the auditorium 700 shown in FIG. 7 becomes larger, the master device 100 may primarily transmit group identification numbers to the slave devices 200 included in each group, and then the master device 100 may broadcast the lighting control signal in associated with the color represented by each group to the slave devices 200 included in each group. Thus, various directing effects may be obtained by determining an outline of the directing pattern using the grouping method and by changing the lighting pattern of each group in real time. However, the directing method according to various embodiment of the inventive concept should not be limited to the dot method or the color book method.

The lighting control signal broadcasted by the master device 100 in FIG. 7 may include various types of data. For instance, the data may include a command, a scenario, and a lighting pattern (e.g., lighting presence, lighting color, lighting time, etc.) directed by each group. The administrator of the master device 100 may input the directing pattern, which is to be controlled, to the master device 100 in real time using various ways, and the master device 100 may broadcast the lighting control signal 701 such that the input directing pattern is output.

As described above, the light-emitting position information previously designated in accordance with the electrical cod information of the ticket are inserted into each slave device 200, and thus various lighting patterns used in the concert hall may be effectively directed.

Figure 8:
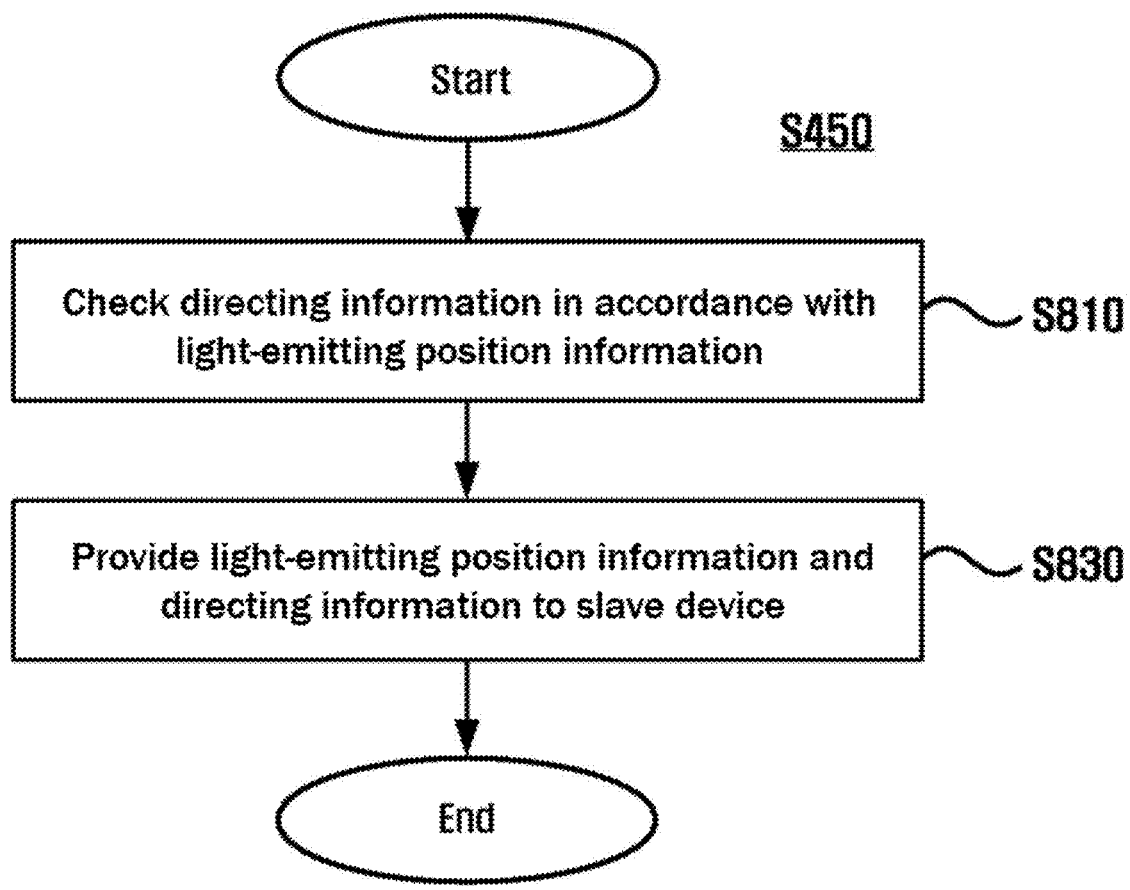
FIG. 8 is a flowchart showing an operation of providing directing information previously set in accordance with light-emitting position information in a master device to a slave device according to various exemplary embodiments of the inventive concept.

FIG. 8 is a flowchart showing an operation of providing the directing information previously set in accordance with the light-emitting position information in the master device 100 to the slave device 200 according to various exemplary embodiments of the inventive concept. Operations shown in FIG. 8 may be examples of operation S450 shown in FIG. 4.

According to various embodiments, in operation S810, the master device 100 may check the directing information previously set in accordance with the light-emitting position information. For instance, when the master device 100 checks the light-emitting position information corresponding to the electrical code information, the master device 100 may additionally or simultaneously check the directing information corresponding to the light-emitting position information. The directing information may be data previously provided to the slave device 200 to direct the lighting with high quality, and may be information controlling the slave device 200 such that the lighting unit 220 of the slave device 200 emits the light by one or more sections that are previously determined.

In operation S830, the master device 100 may provide the light-emitting position information and the directing information to the slave device 200. In this case, the light-emitting position information and the directing information may be transmitted in a single data form, but they should not be limited thereto or thereby.

According to some embodiments, the master device 100 may provide a lock signal to the slave device 200 to drive the slave device 200 in a lock mode during a predetermined period. As an example, the lock mode indicates a state in which the lighting unit or a power unit of the slave device 200 may not be operated. Accordingly, undesired noise lighting pattern caused by operations of some slave devices 200 may be prevented from occurring during the lighting directed in accordance with the scenario previously determined.

According to additional embodiments, in the case that the previously set conditions are satisfied, the master device 100 may control the slave device (e.g., a first slave device) to allow the slave device 200 to transmit the light-emitting position information and the directing information thereof to another slave device (e.g., a second slave device) disposed adjacent to the slave device 200.

According to various embodiment, a first condition of the previously set conditions indicates a case in which the light-emitting position information is not included in the second slave device. For instance, a case, in which the administrator of the mater device 100 does not insert the light-emitting position information corresponding to the electrical code information into the slave device (e.g., the second slave device) after scanning the electrical code information from the ticket, may occur. In this case, when the mater device 100 broadcasts the lighting control signal, the second slave device may transmit a response signal, which indicates that the second slave device may not identify the lighting control signal corresponding to the light-emitting position information included therein among the lighting control signals, to the master device 100.

Meanwhile, a second condition of the previously set conditions may be set to allow the directing information of the second device to be the same as the directing information of the first slave device disposed adjacent to the second slave device. If the directing information transmitted to the second slave device are different from the directing information of the first slave device, the noise may be caused entirely when a specific lighting pattern is directed.

Accordingly, in the case that the first condition is satisfied, the second slave device may search the slave devices disposed in the vicinity thereof and collect the light-emitting position information of at least one slave device of the searched slave devices. The second slave device may transmit the collected light-emitting position information to the master device 100, and the master device 100 may check whether the directing information corresponding to the corresponding light-emitting position information is the same as the directing information provided to the second slave device in the storing unit 130 or the server 300 on the basis of the received light-emitting position information. In the case that the directing information corresponding to the corresponding light-emitting position information is the same as the directing information provided to the second slave device, the master device 100 may transmit the signal that controls the checked slave device (e.g., the first slave device) to transmit the light-emitting position information and the directing information of the first slave device to the second slave device. As a result, the first slave device may transmit the light-emitting position information and the directing information thereof to the second slave device.

Accordingly, although the show begins, information required to perform the direction may be indirectly provided to the slave device 200, and thus the planned lighting pattern may be smoothly directed.

Figure 9:
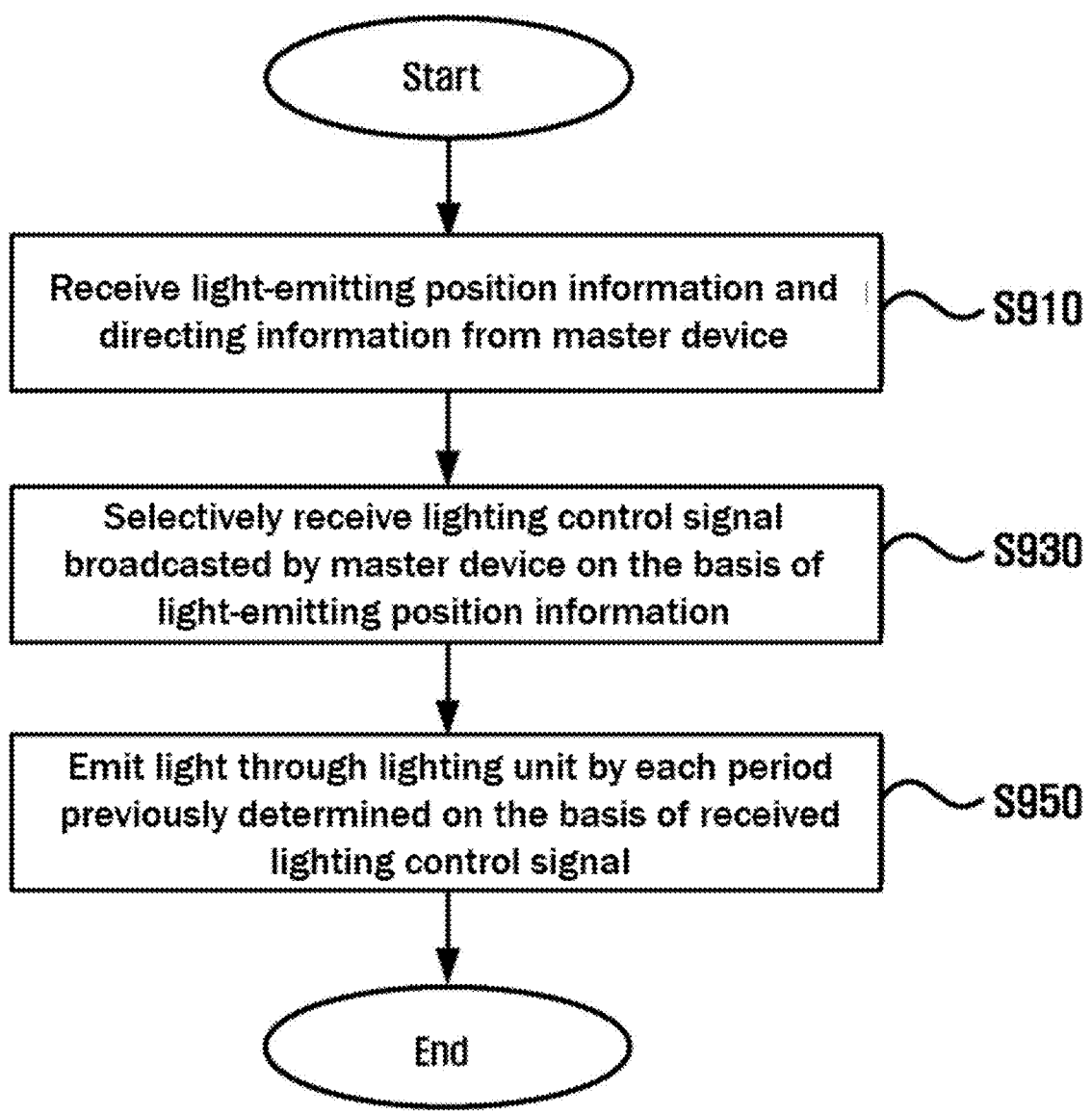
FIG. 9 is a flowchart showing an operation of controlling a lighting unit in a slave device on the basis of directing information provided from a master device according to various exemplary embodiments of the inventive concept.

FIG. 9 is a flowchart showing an operation of controlling the lighting unit 220 by the slave device 200 on the basis of the directing information provided from the master device 100 according to various exemplary embodiments of the inventive concept. In FIG. 9, detailed descriptions of the same operations as those shown in FIG. 5 will be omitted.

According to various embodiment, in operation S910, the slave device 200 may receive the light-emitting position information and the directing information from the master device 100. In this case, the slave device 200 may store the received light-emitting position information and the directing information into the storing unit 230.

In operation S930, the slave device 200 may selectively receive the lighting control signal broadcasted by the master device 100 on the basis of the light-emitting position information.

According to various embodiments, in operation S950, the slave device 200 may emit the light through the lighting unit by periods previously determined on the basis of the received lighting control signal.

For instance, the slave device 200 may operate the lighting unit 220 on the basis of first directing information during a first period (e.g., a first time) and operate the lighting unit 220 on the basis of second directing information during a second period (e.g., a second time). The slave device 200 may automatically operate the lighting unit 220 in response to the directing information determined depending on the periods or may operate the lighting unit 220 by selectively receiving an activation signal, which is broadcasted by the master device 100, by each period.

Figure 10:
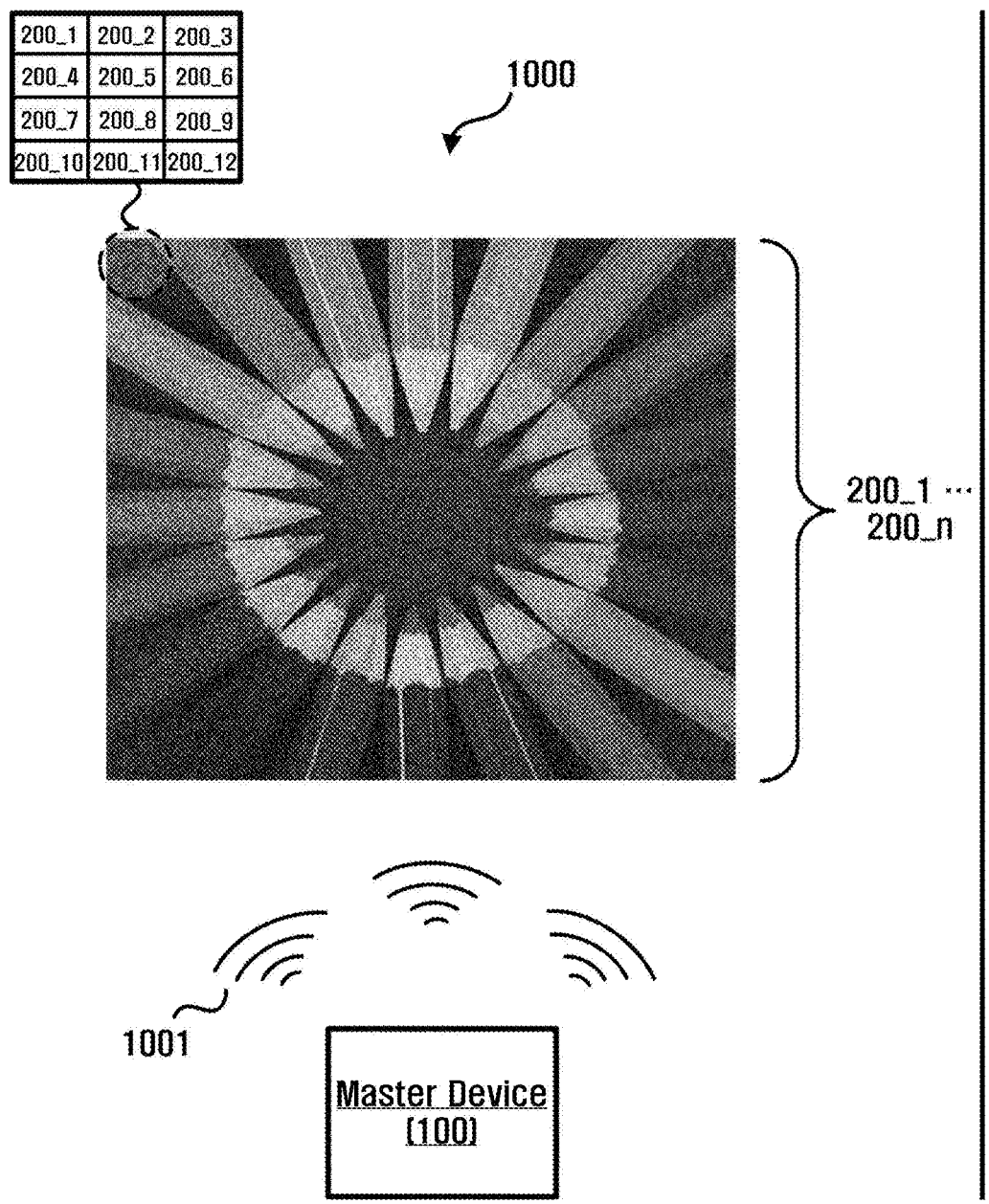
FIG. 10 is a view showing an operation of allowing a slave device to emit a light in accordance with directing information previously set in a master device according to various exemplary embodiments of the inventive concept.

FIG. 10 is a view showing an operation of allowing the slave device 200 to emit the light in accordance with the directing information previously set in the master device 100 according to various exemplary embodiments of the inventive concept. In FIG. 10, detailed descriptions of the same features as those in FIG. 7 will be omitted.

Different from FIG. 7, the lighting pattern having relatively high quality is directed in an auditorium 1000. To this end, the light-emitting position information and the directing information may be previously stored in each slave device 200. In addition, each slave device 200 may include information on which scenario is directed among previously set scenarios, information required to select an image processing function, such as a dissolve technique, a fade technique, etc., or information about a function of setting a duration of the lighting pattern.

According to various embodiment, the slave device 200 may store the data and direct a previously-set lighting pattern (e.g., specific pixel data) in response to the lighting control signal (e.g., a flag signal) broadcasted by the master device 100. As described above, when the data are previously stored in the slave device 200, the lighting pattern having the high quality may be rapidly and precisely directed.

In addition, various lighting patterns for the cheering tool (slave) may be generated by directing the lighting pattern having the high quality in athletics or concerts, and the cheering effect caused by the various lighting patterns may be improved.

In the above-mentioned descriptions, the function of the lighting control system 10 using the electrical code information has been described. Hereinafter, a function of a lighting control system 10 using the control of the radio wave intensity will be described. However, the lighting control system 10 shown in FIGS. 1 to 10 and the lighting control system 10 shown in FIGS. 11 to 18 are not limited to be operated independently, and the lighting control system 10 shown in FIGS. 1 to 10 and the lighting control system 10 shown in FIGS. 11 to 18 may be configured to further include configurations and functions of each other.

Figure 11:
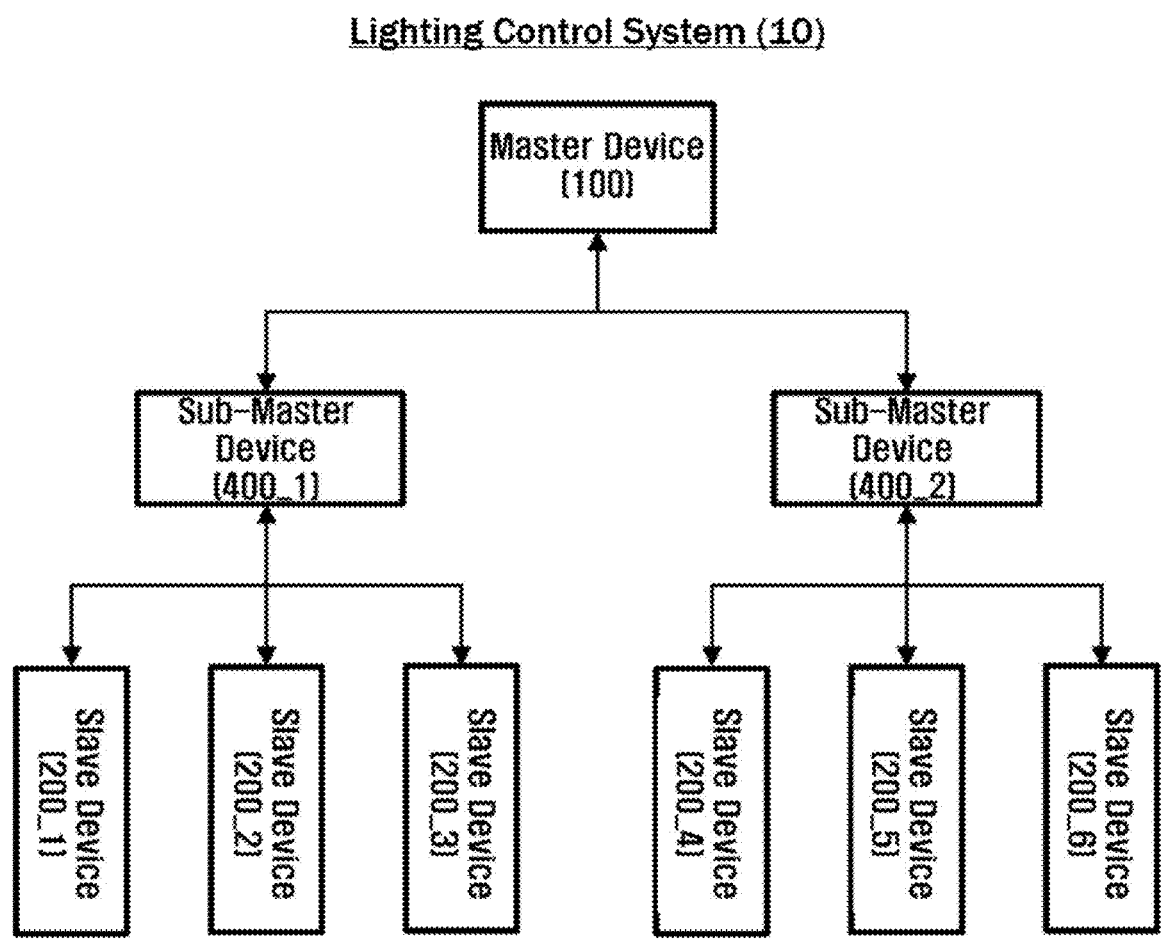
FIG. 11 is a block diagram showing a lighting control system according to another exemplary embodiment of the inventive concept.

FIG. 11 is a block diagram showing the lighting control system 10 according to another exemplary embodiment of the inventive concept. In the present exemplary embodiment, different features of the lighting control system 10 shown in FIG. 11 from those of the lighting control system 10 shown in FIG. 1 will be mainly described. Accordingly, in FIG. 11, detailed descriptions of the same elements as those in FIG. 1 will be omitted or briefly described.

The lighting control system 10 may include a master device 100, one or more sub-master devices 400, and one or more slave devices 200. The lighting control system 10 may control the radio wave intensity of the sub-master devices 400 by using the master device 100, and thus the lighting pattern of the slave devices 200 may be controlled.

Although not shown in FIG. 11, the lighting control system 10 may further include an external device (e.g., the server 300). Accordingly, at least a component (e.g., the master device) of the lighting control system 10 may communicate with the external device to transmit/receive information required to direct the lighting pattern to/from the external device.

According to various embodiments, the master device 100 may control the lighting of the slave devices 200 through the sub-master devices 400.

The sub-master devices 400 may periodically control the radio wave intensity or control the radio wave intensity by a predetermined interval, and thus the lighting of the slave devices 200 may be controlled. As an example, the sub-master devices 400 may be electronic devices fixedly provided at predetermined positions, but they should not be limited thereto or thereby.

According to various embodiments, the slave devices 200 may perform a function of directing various types of lighting pattern in real time or by a predetermined interval under the control of the master device 100 or the sub-master devices 400.

The master device 100, the sub-master devices 400, and the slave devices 200 may communicate with each other in various ways. As an example, the master device 100 and the salve devices 200 may be connected to each other in a wireless communication network, e.g., an RF communication, an electric tag, etc., and the master device 100 and the sub-master devices 400 may be connected to each other in a telecommunication network, but they should not be limited thereto or thereby. In addition, the sub-master devices 400 and the slave devices 200 may be connected to each other in a telecommunication network, but they should not be limited thereto or thereby.

According to various embodiments, the communication unit 110 of the master device 100 may provide a communication between the master device 100 and the slave devices 200, between the master device 100 and the server 300, or between the master device 100 and the sub-master device 400.

In addition, the light-emitting position information stored in the storing unit 130 of the master device 100 may be information that are previously set to identify or group the slave devices 200 for the directing of the show in the master device 100 or the sub-master device 400.

In addition, the lighting control unit 160 of the master device 100 may transmit the lighting control signal to the sub-master devices 400 or the slave devices 200.

According to various embodiments, the lighting control unit 160 of the master device 100 may check the light-emitting position information of the slave devices 200 and may broadcast or transmit a first lighting control signal to the sub-master device 400 to control the radio wave intensity of an antenna module 215 (refer to FIG. 12) of the sub-master device 400, thereby controlling the lighting pattern of the slave devices 200. The first lighting control signal may be used to allow the master device 100 to control the sub-master device 400 and may include ID information corresponding to each sub-master device 400 such that the sub-master devices 400 selectively receive the first lighting control signal.

According to various embodiments, the first lighting control signal may include a radio wave intensity value and a lighting pattern value of the sub-master devices 400. The radio wave intensity value may indicate a specific radio wave intensity, and a control radius corresponding to a predetermined radius with respect to the sub-master device 400 may be set in accordance with the radio wave intensity value. In addition, the lighting pattern value may be specific values required to control a lighting timing, a lighting color, and a lighting duration of the slave device 200 disposed in the control radius. The lighting timing indicates a time point at which the slave device 200 disposed in the control radius begins to emit the light. For instance, the lighting pattern value may be a lighting timing value, a lighting color value, or a lighting duration.

The above-mentioned first lighting control signal will be described in detail with reference to FIGS. 14 to 17.

According to additional embodiments, the lighting control unit 160 may broadcast a second lighting control signal corresponding to the light-emitting position information of each slave device 200 in a wireless channel to directly control the slave devices 200. For instance, the lighting control unit 160 may broadcast the second lighting control signal to the slave devices 200, and each slave device 200 may selectively receive the second lighting control signal corresponding to its light-emitting position information among the second lighting control signals broadcasted by the lighting control unit 160.

The communication unit 210 of the slave device 200 according to the embodiment shown in FIG. 11 may provide a communication between the slave devices 200 and the master device 100 or between the slave devices 200 and the sub-master device 400.

The lighting control unit 250 of the slave device 200 according to the embodiment shown in FIG. 11 may receive the lighting pattern information broadcasted by the sub-master device 400 or provided from the sub-master device and may control the lighting unit 220 in response to the lighting pattern information. In addition, the lighting control unit 250 may selectively receive the lighting control signal corresponding to the light-emitting position information of the storing unit 230 among the lighting control signals (e.g., the second lighting control signals) broadcasted by the master device 100 and may control the lighting unit 220 on the basis of the received lighting control signal.

Figure 12:
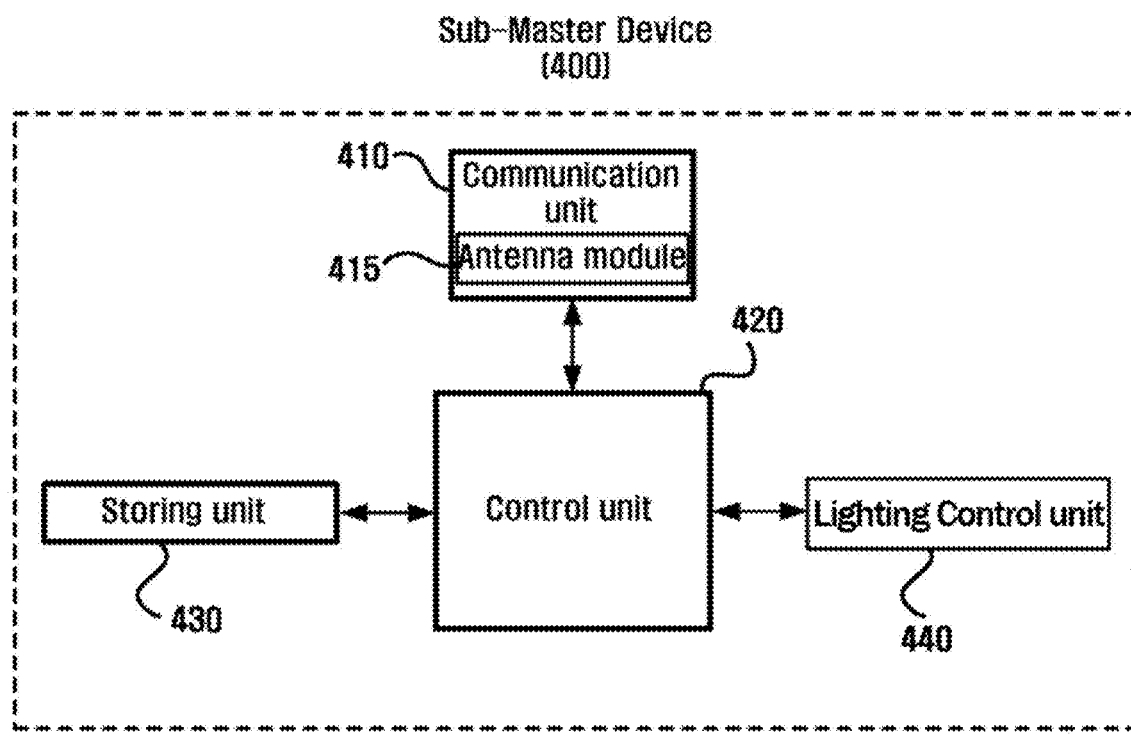
FIG. 12 is a block diagram showing a sub-master device according to various exemplary embodiments of the inventive concept.

FIG. 12 is a block diagram showing the sub-master device 400 according to various exemplary embodiments of the inventive concept.

The sub-master device 400 may include a communication unit 410, a control unit 420, a storing unit 430, and a lighting control unit 440. According to various embodiments, the sub-master device 400 may further include additional units, e.g., an input module, a display module, a power module, an audio module, etc., or some units of the sub-master device 400 shown in FIG. 12 may be omitted.

The communication unit 410 may provide a communication between the sub-master device 400 and the master device 100 or between the sub-master device 400 and the slave device 200. The communication unit 410 may include, for example, at least one of a wired communication module (e.g., a connector, a connector module, etc.) and a wireless communication module (e.g., an RF transceiver, a Zigbee module, a Bluetooth, a WIFI module, etc.).

According to various embodiments, the communication unit 410 may include the antenna module 415. The antenna module 415 may include at least one antenna and have a configuration to control the radio wave intensity in proportion to a current applied there to or a level of a voltage. For instance, in a case that the radio wave intensity is received from the mater device 100, the communication unit 410 or the antenna module 415 of the sub-master device 400 may control the intensity of the radio wave under the control of the control unit 420 or the lighting control unit 440, and thus the control radius required to control the slave device 200 may be set/changed.

The control unit 420 may perform a data processing function to control an overall operation, e.g., a control of power supply, of the sub-master device 400 and a signal flow between components in the sub-master device 400. The control unit 420 may include at least one processor.

The storing unit 430 may store data provided from or generated by other components of the control unit 420, the sub-master device 400, or the lighting control system 10. The storing unit 430 may include, for example, a memory, a cash, a buffer, etc.

According to various embodiments, the storing unit 430 may store the radio wave intensity value and the lighting pattern value, which are provided from the master device 100. In addition, the storing unit 430 may store the ID information corresponding to the sub-master device 400 to selectively receive the lighting control signal broadcasted by the master device 100.

The lighting control unit 440 may control the radio wave intensity of the antenna module 415 on the basis of the lighting control signal provided from the master device 100 and control the lighting pattern of the slave device 200 in the control radius set in accordance with the control of the radio wave intensity. The lighting control unit 440 will be described in detail with reference to accompanying drawings.

Figure 13:
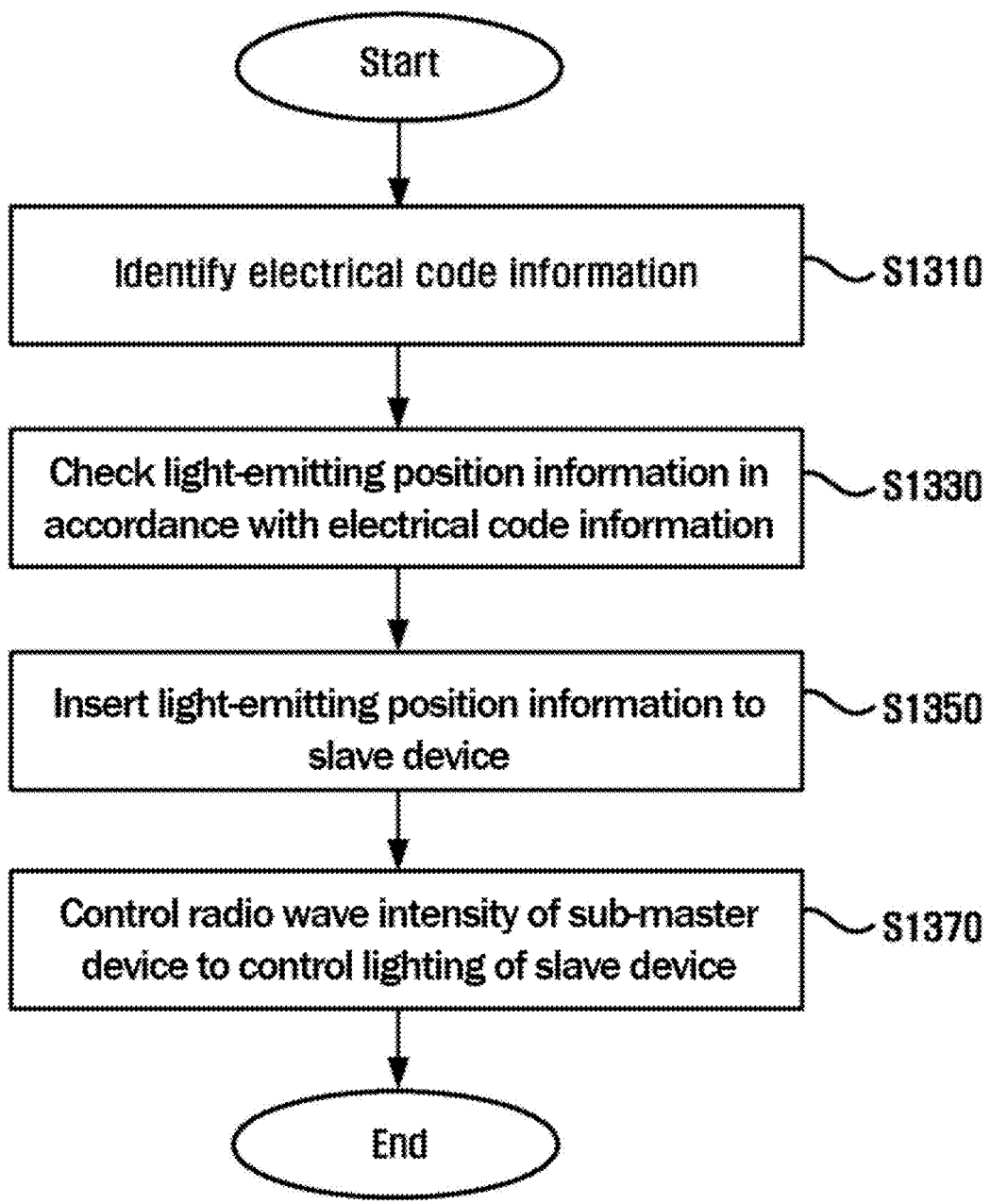
FIG. 13 is a flowchart showing an operation of controlling a lighting of a slave device by controlling a radio wave intensity of a sub-master device in a master device according to various exemplary embodiments of the inventive concept.

FIG. 13 is a flowchart showing an operation of controlling the lighting of the slave device 200 by controlling the radio wave intensity of the sub-master device 400 in the master device 100 according to various exemplary embodiments of the inventive concept.

In operation S1310, the master device 100 may scan the electrical code printed on the ticket of audiences to identify the electrical code information. For instance, the user (e.g., administrator) of the master device 100 may scan the electrical code information printed on the ticket using the electrical code identification unit 120, e.g., an optical scanner, and extract the electrical code information.

Then, in operation S1330, the master device 100 may check the light-emitting position information in accordance with the electrical code information. For instance, the master device 100 may check the light-emitting position information mapped in the electrical code information on the storing unit 130 or the server 300.

In operation S1350, the master device 100 may provide (e.g., insertion) the checked light-emitting position information to the slave device 200. For instance, after the checking of the electrical code information and the providing of the light-emitting position information, the administrator of the master device 100 may provide the slave device 200, into which the light-emitting position information is inserted, to the audiences who brought the ticket. The audiences may confirm an assigned seat in the concert hall on the basis of the seat information and may sit in the corresponding seat.

In operation S1370, the master device 100 may control the radio wave intensity of the sub-master device 400 to control the lighting pattern of the slave device 200. In this case, one or more sub-master devices 400 may be fixedly located at positions arranged at regular intervals in a concert hall or a sport arena. In addition, the slave devices 200 may be held by the user in the seat adjacent to the sub-master device 400 or may move along the user's movement.

The master device 100 may broadcast the lighting control signal (e.g., the first lighting control signal). For instance, the master device 100 may transmit the lighting control signal to the sub-master devices 400 in accordance with a certain scenario of the show or the real time control. In this case, the master device 100 may continuously or periodically broadcast or transmit the same lighting control signal to the sub-master devices 400 that are unspecified.

Figure 14:
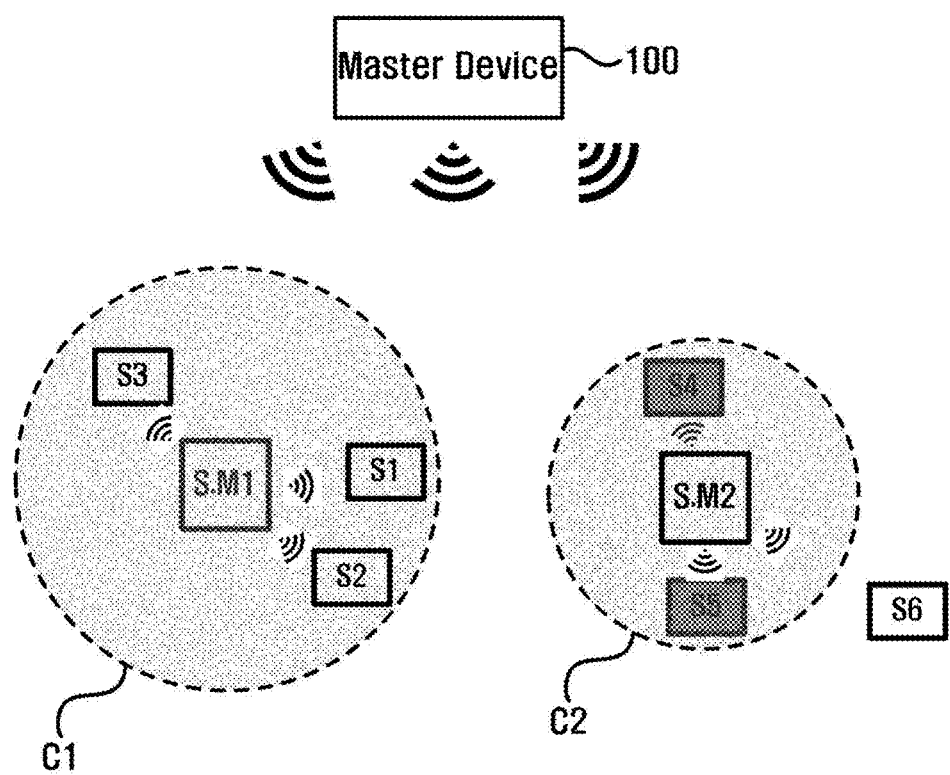
FIG. 14 is a view showing an operation of a lighting control system according to various exemplary embodiments of the inventive concept.

FIG. 14 is a view showing an operation of a lighting control system 10 according to various exemplary embodiments of the inventive concept.

As shown in FIG. 14, the master device 100 may transmit the lighting control signal mapped in accordance with the ID information of each sub-master device to a first sub-master device S.M1 and a second sub-master device S.M2. In this case, the lighting control signal may include a first radio wave intensity value allowing the first sub-master device S.M1 to set a first control radius C1 and a first lighting pattern value allowing first, second, and third slave devices S1, S2, and S3 disposed in the first control radius C1 to emit the light having a red color.

In addition, the lighting control signal may include a second radio wave intensity value allowing the second sub-master device S.M2 to set a second control radius C2 and a second lighting pattern value allowing fourth and fifth slave devices S4 and S5 disposed in the second control radius C2 to emit the light having a blue color. In this case, since a sixth slave device S6 does not belong to any of the first control radius C1 and the second control radius C2, the sixth slave device S6 is maintained in an OFF state.

According to various embodiments, the master device 100 may output the lighting control signal at an arbitrary time point or a predetermined period to change the first control radius C1 and the second control radius C2. For instance, although not shown in figures, when the master device 100 outputs the lighting control signal such that the second control radius C2 increases and the sixth slave device S6 is disposed in the second control radius C2, the sixth slave device S6 may emit the light having the blue color.

Figure 15:
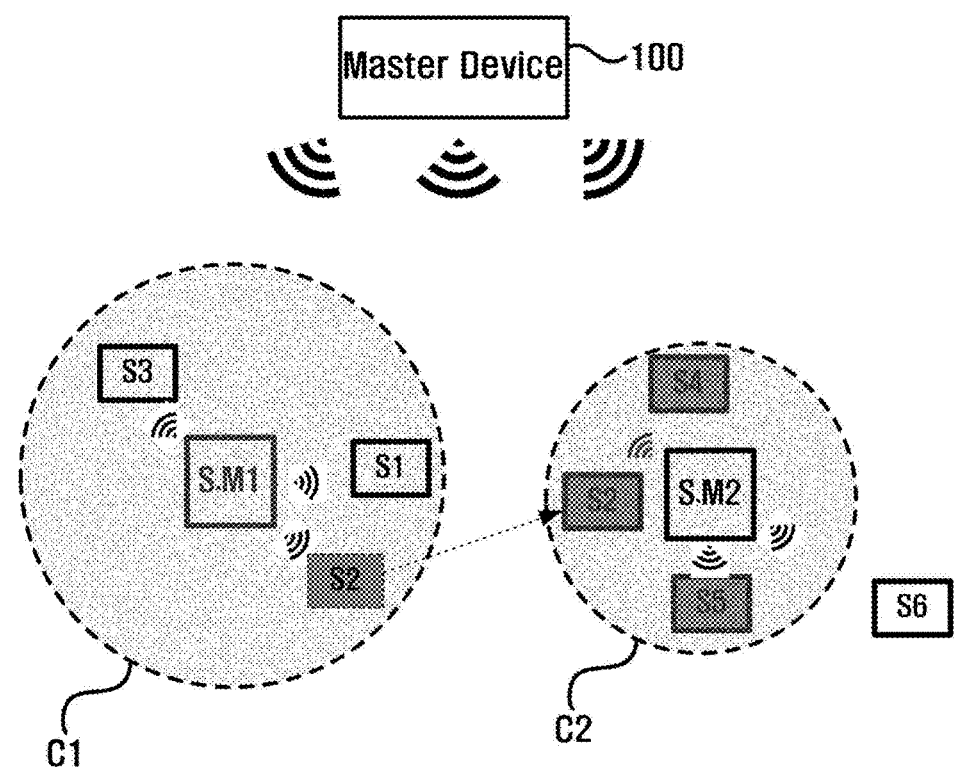
FIG. 15 is a view showing a variation in a lighting pattern in accordance with a movement of a slave device in a lighting control system according to various exemplary embodiments of the inventive concept.
Figure 16:
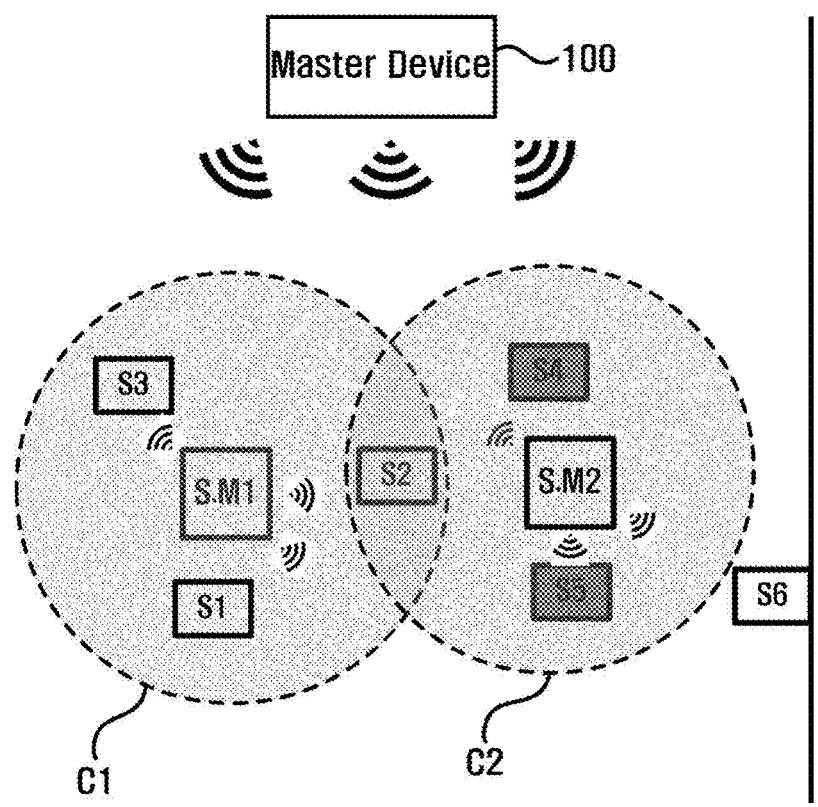
FIG. 16 is a view showing a variation in a lighting pattern when a slave device is located at a position in a plurality of control radii in a lighting control system according to various exemplary embodiments of the inventive concept.

FIG. 15 is a view showing a variation in a lighting pattern in accordance with a movement of a slave device 200 in a lighting control system 10 according to various exemplary embodiments of the inventive concept, and FIG. 16 is a view showing a variation in a lighting pattern when a slave device 200 is located at positions in a plurality of control radii in a lighting control system 10 according to various exemplary embodiments of the inventive concept.

Referring to FIG. 15, in a case that the second slave device 200 moves to the second control radius C2 from the first control radius C1, the second slave device 200 is operated under the control of the second sub-master device S.M2 without being controlled by the first sub-master device S.M1. Accordingly, the second slave device S2 emits the light having the blue color instead of the light having the red color.

In addition, referring to FIG. 16, the second slave device S2 may be disposed in both of the first control radius C1 and the second control radius C2 due to the movement of the user of the second slave device S2. In this case, the second slave device S2 may emit the light having an average value of the first lighting pattern value and the second lighting pattern value.

For instance, in a case that the lighting unit 220 of the second slave device S2 has a structure in which the LEDs are stacked one on another in a depth direction, some LEDs of the LEDs emit the blue light and the other LEDs of the LEDs emit the red light on the basis of the first and second lighting pattern values. In this case, the second slave device 200 may be perceived as a purple color when viewed in a top view. However, the second slave device S2 may emit the light in various ways on the basis of the first and second lighting pattern values in accordance with the configurations of the lighting unit 220 or a lighting plan.

According to the above-mentioned embodiments, the lighting control system 10 may control the slave devices 200 using the sub-master devices 400, and thus the lighting control system 10 may effectively control the slave devices 200.

Figure 17:
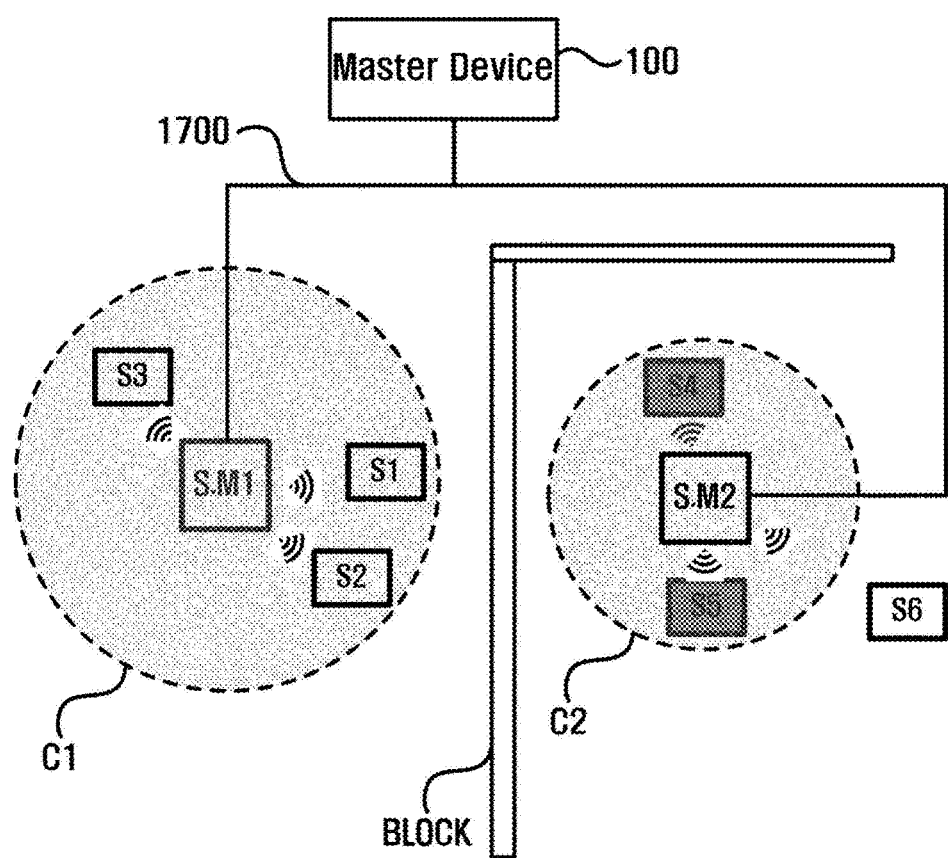
FIG. 17 is a view showing a structure in which a master device is wire-connected to each sub-master device in a lighting control system according to various exemplary embodiments of the inventive concept.

FIG. 17 is a view showing a structure in which the master device 100 is wire-connected to each sub-master device 400 in the lighting control system 10 according to various exemplary embodiments of the inventive concept. This structure shown in FIG. 17 is to prevent a phenomenon, in which the lighting control signal is not applied to the sub-master device 400, from occurring when an obstacle, such as a block, is located between the master device 100 and the sub-master device 400.

As shown in FIG. 17, the master device 100 may be connected to the first sub-master device S.M1 and the second sub-master device S.M2 by a wired cable 1700. The master device 100 may transmit the lighting control signal to each of the first and second sub-master devices S.M1 and S.M2 in a wired transmission mode. Accordingly, the master device 100 may stably transmit the lighting control signal to the second sub-master device S.M2 surrounded by the block.

Figure 18:
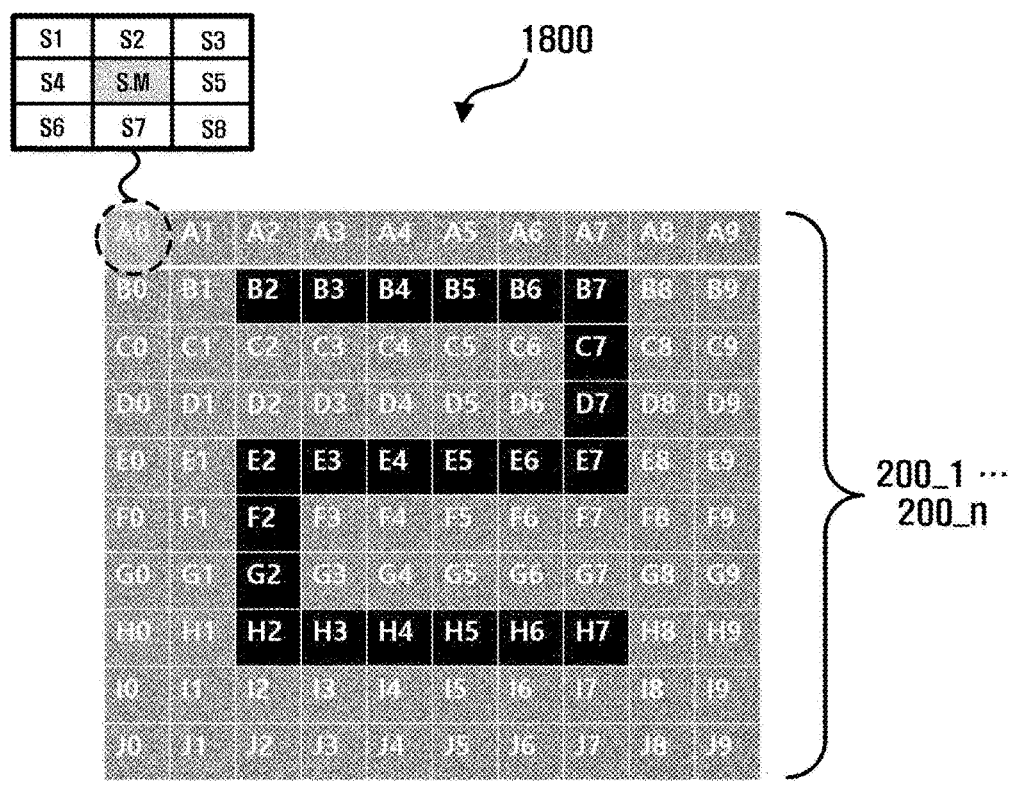
FIG. 18 is a view showing a directing screen in accordance with an operation of a lighting control system according to various exemplary embodiments of the inventive concept.
Figure 18:
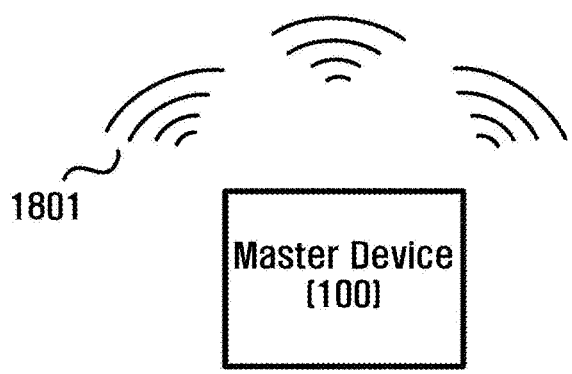

FIG. 18 is a view showing a directing screen in accordance with an operation of the lighting control system 10 according to various exemplary embodiments of the inventive concept.

Referring to FIG. 18, an auditorium 1800, in which a plurality of sub-slave devices 200_1 to 200_n, one or more sub-master devices 400 controlling the sub-slave devices 200_1 to 200_n, the master device 100 transmitting the lighting control signal to the sub-master device 400 are disposed, is shown. The auditorium 1800 includes groups of A0 to J9, and one group (e.g., A0) may include the slave devices (e.g., S1 to S8) of the audiences sitting in seats and the sub-master device (e.g., S.M) controlling the lighting of the slave devices (e.g., S1 to S8). For the convenience of explanation, the slave devices (e.g., S1 to S8) and the sub-master device (e.g., S.M) are located at predetermined positions in the A0 group, but they should not be limited thereto or thereby. That is, the slave devices (e.g., S1 to S8) and the sub-master device (e.g., S.M) may be arranged in the forms shown in FIGS. 14 to 17.

The master device 100 may broadcast the lighting control signal 1801 to the sub-master device 400 after the show begins or during the show. The lighting control signal 1801 may be a signal controlling the lighting pattern of the slave devices 200 belonging to each control radius generated by controlling the radio wave intensity of each sub-master device 400. For instance, the lighting control signal 1801 may be a signal directing the slave devices to output the number "2" when viewed as a whole as shown in FIG. 18. As described above, the directed screen may be represented by controlling the radio wave intensity of the sub-master device S.M, but the directed screen may be directed by the master device 100 that directly controls the slave device 200. For instance, the master device 100 may broadcast the light-emitting position information of the slave device 200 and the directing information or the lighting pattern value corresponding to the light-emitting position information, and thus the master device 100 may directly control the lighting of the slave device 200. In this case, the slave device 200 may selectively receive the information corresponding to its light-emitting position information among the information broadcasted by the master device 100, and thus the lighting unit 220 may be controlled.

The slave devices 200 may be effectively controlled after being grouped through the embodiments described with reference to FIGS. 11 to 18, and the lighting control system 10 may effectively control the slave devices 200 that move in real time.

The term "module" or "~ section" used herein may represent, for example, a unit including one or more combinations of hardware, software and firmware. The term "module" or "~ section" may be interchangeably used with the terms "unit", "logic", "logical block", "component" and "circuit". The "module" or "~ section" may be a minimum unit of an integrated component or may be a part thereof. The "module" or "~ section" may be a minimum unit for performing one or more functions or a part thereof. The "module" or "~ section" may be implemented mechanically or electronically.

A module or a programming module according to an embodiment of the inventive concept may include at least one of the above elements, or a portion of the above elements may be omitted, or additional other elements may be further included. Operations performed by a module, a programming module, or other elements according to an embodiment of the inventive concept may be executed sequentially, in parallel, repeatedly, or in a heuristic method. Also, a portion of operations may be executed in different sequences, omitted, or other operations may be added.

What is claimed is:

1. A lighting control system for directing a show, the system comprising:
   a master device; and
   a plurality of slave devices configured to receive lighting control signals, which are wirelessly broadcasted by the master device, the light control signals being configured to control the plurality of slave devices and corresponding to seats of a plurality of audiences in an auditorium,
   wherein the plurality of slave devices are configured to receive
      position information indicating specific positions at which the plurality of slave devices, which correspond to preset code information, emit a light,
      light-emitting status information including preset information to classify the plurality of slave devices into a plurality of groups, and
      group identification number information, and
   be grouped in accordance with received information,
   wherein the master device controls the grouped plurality of slave devices to emit a light per group basis by broadcasting the lighting control signals including group light-emitting pattern information for each of the plurality of groups of the plurality of slave devices, and
   wherein each of the plurality of slave devices comprises:
      a lighting unit; and
      a lighting control unit configured to
         selectively extract a lighting control signal of the group identification number information being mapped with the preset code information from the lighting control signals broadcasted by the master device, and
         control the lighting unit on the basis of the group light-emitting pattern information corresponding to the selectively extracted lighting control signal.

2. The lighting control system according to claim 1, wherein the master device comprises:
   an information check unit configured to
      obtain, from code information of each ticket corresponding to each slave device of the plurality slave devices, information on a respective seat position of each of the plurality of slave devices positioning on the seats of the plurality of audiences in the auditorium, and
      obtain light-emitting status information corresponding to the obtained seat position.

3. The lighting control system according to claim 1, wherein each of the plurality of slave devices is configured to control the lighting unit by periods predetermined on the basis of the received lighting control signals.

4. The lighting control system according to claim 3, wherein
   the master device is configured to provide directing information to a first slave device,
   the directing information is information to control the first slave device such that the lighting unit of the first slave device emits the light by one or more predetermined periods, and
   the directing information is activated when the first slave device receives the lighting control signal.

5. The lighting control system according to claim 4, wherein the master device is configured to transmit a lock signal to the plurality of slave devices to drive the first slave device in a lock mode during a predetermined period.

6. The lighting control system according to claim 4, wherein the master device comprises:
   a storing unit configured to store the group identification number information corresponding to the preset code information, and store the directing information.

7. The lighting control system according to claim 6, wherein the lighting control unit extracts the lighting control signal of the group identification number information stored in the storing unit, from lighting control signals broadcasted by the master device.

* * * * *